US007609652B2

(12) United States Patent
Kellerer et al.

(10) Patent No.: US 7,609,652 B2
(45) Date of Patent: Oct. 27, 2009

(54) APPARATUS AND METHOD FOR CONTROLLING AN OPERATION OF A PLURALITY OF COMMUNICATION LAYERS

(75) Inventors: Wolfgang Kellerer, Fuerstenfeldbruck (DE); Eckehard Steinbach, Olching (DE); Lai-U Choi, Munich (DE)

(73) Assignee: NTT DoCoMo, Inc., Tokyo (JP)

( * ) Notice: Subject to any disclaimer, the term of this patent is extended or adjusted under 35 U.S.C. 154(b) by 515 days.

(21) Appl. No.: 11/404,941

(22) Filed: Apr. 14, 2006

(65) Prior Publication Data

US 2006/0259627 A1 Nov. 16, 2006

Related U.S. Application Data

(63) Continuation of application No. PCT/EP03/11446, filed on Oct. 15, 2003.

(51) Int. Cl.
*H04J 3/16* (2006.01)
(52) U.S. Cl. ............... 370/252; 370/329; 370/469; 709/227; 709/228
(58) Field of Classification Search ........... 370/469; 709/227
See application file for complete search history.

(56) References Cited

U.S. PATENT DOCUMENTS

| | | | | |
|---|---|---|---|---|
| 5,790,553 | A * | 8/1998 | Deaton et al. | 370/466 |
| 6,038,609 | A | 3/2000 | Geulen | |
| 6,651,117 | B1 * | 11/2003 | Wilson et al. | 710/33 |
| 6,757,297 | B1 * | 6/2004 | Chin | 370/469 |
| 7,016,668 | B2 * | 3/2006 | Vaidyanathan et al. | 455/418 |
| 7,162,722 | B1 * | 1/2007 | Supinski et al. | 719/310 |

(Continued)

FOREIGN PATENT DOCUMENTS

| | | |
|---|---|---|
| JP | 2003-519959 | 6/2003 |
| WO | WO-01/50669 | 7/2001 |

OTHER PUBLICATIONS

Ott, et al., "An Architecture for Adaptive QoS and its Application to Multimedia Systems Design," Computer Communications 21:334-349 (1998).

(Continued)

*Primary Examiner*—Seema S Rao
*Assistant Examiner*—Steven Wood
(74) *Attorney, Agent, or Firm*—Nutter McClennen & Fish LLP; John J. Penny, Jr.

(57) ABSTRACT

An apparatus for controlling an operation of a plurality of communication layers in a layered communication system provides a property of the communication channel, and includes a storage element for storing a first plurality of sets of parameters defining operation modes of a first communication layer of the plurality of communication layers and for providing a second plurality of sets of parameters defining operation modes of a second communication layer of the plurality of communication layers, a selector for selecting a first set of parameters from the first plurality of sets of parameters and for selecting a second set of parameters from the second plurality of sets of parameters in dependence on the channel property and an optimization goal and provides the first set of parameters to the first communication layer and the second set of parameters to the second communication layer.

24 Claims, 15 Drawing Sheets

U.S. PATENT DOCUMENTS

| | | | |
|---|---|---|---|
| 7,218,645 B2* | 5/2007 | Lotter et al. | 370/469 |
| 7,366,133 B1* | 4/2008 | Majidi-Ahy et al. | 370/329 |
| 2002/0004827 A1* | 1/2002 | Ciscon et al. | 709/223 |
| 2003/0067907 A1* | 4/2003 | Rezaiifar et al. | 370/349 |
| 2003/0076810 A1* | 4/2003 | Rezaiifar et al. | 370/349 |
| 2003/0081580 A1* | 5/2003 | Vaidyanathan et al. | 370/338 |
| 2003/0174731 A1* | 9/2003 | Tafazolli et al. | 370/469 |
| 2003/0219034 A1* | 11/2003 | Lotter et al. | 370/469 |
| 2004/0032835 A1* | 2/2004 | Majidi-Ahy et al. | 370/252 |
| 2004/0202197 A1* | 10/2004 | Gao et al. | 370/469 |
| 2005/0152280 A1* | 7/2005 | Pollin et al. | 370/252 |
| 2006/0114836 A1* | 6/2006 | Pollin et al. | 370/252 |
| 2006/0146831 A1* | 7/2006 | Argyropoulos et al. | 370/394 |
| 2006/0171364 A1* | 8/2006 | Bosch et al. | 370/338 |

OTHER PUBLICATIONS

Hou, et al., "Communication Middleware and Software for QoS Control in Distributed Real-Time Environments," IEEE (XP010247361), pp. 558-564 (1997).

Dunlop, et al., "QoS Management with Dynamic Bearer Selection Schemes," Computer Networks 37:45-53 (2001).

Landfeldt, et al., "User Service Assistant: An End-to-End Reactive QoS Architecture," IEEE (XP004304933), pp. 45-53 (2001).

Chou, et al., "Rate-Distortion Optimized Streaming of Packetized Media," (XP-002282187), pp. 1-43 (2001).

Stuhlmuller, et al., "Analysis of Video Transmission over Lossy Channels," IEEE (XP-002282188), 18:1012-1032 (2000).

International Search Report dated Sep. 6, 2004.

International Preliminary Examination Report dated Feb. 22, 2006.

Office Action issued in connection with corresponding Japanese Patent Application No. 2005-509810, issued on Nov. 19, 2008.

* cited by examiner

- Control frame scheduling: frame prioritization

FIG 6

Link-Layer:
- Transmission time arrangements in multi-user scheduling reduced to 7 cases

|        | Case 1 | Case 2 | Case 3 | Case 4 | Case 5 | Case 6 | Case 7 |
|--------|--------|--------|--------|--------|--------|--------|--------|
| User 1 | 3/9    | 4/9    | 4/9    | 3/9    | 2/9    | 3/9    | 2/9    |
| User 2 | 3/9    | 3/9    | 2/9    | 4/9    | 4/9    | 2/9    | 3/9    |
| User 3 | 3/9    | 2/9    | 3/9    | 2/9    | 3/9    | 4/9    | 4/9    |

FIG 8
- Maximization of the worst performing user
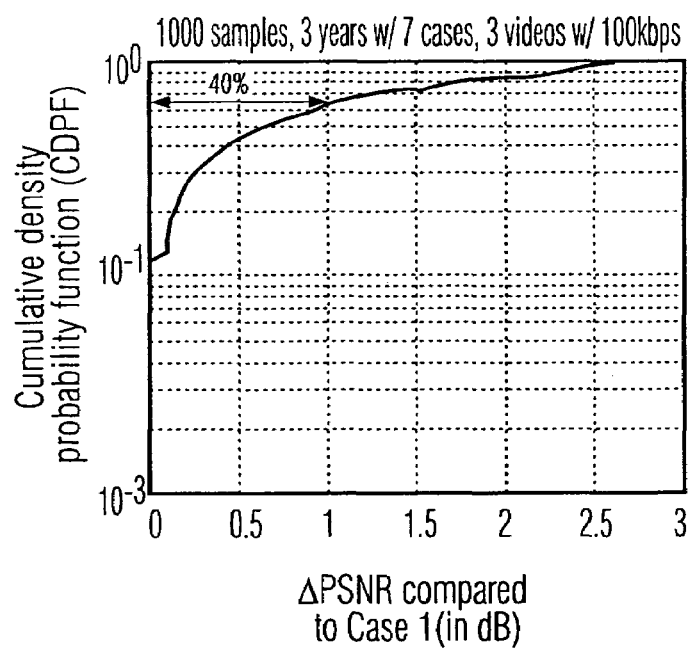
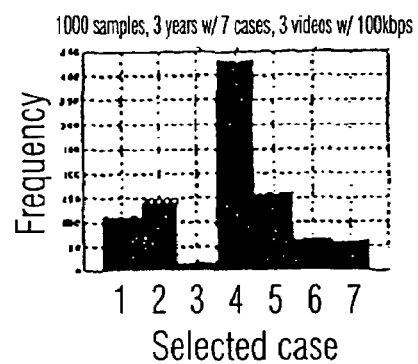
SNR of user A=B=C=5 dB
Pc is the same.
        A     B     C
Case 1  27.51  23.67  29.02
Case 4  27.51  25.84  25.46
ΔPSNR=1.79 dB

FIG 11A

|        | Case 1 | Case 2 | Case 3 | Case 4 | Case 5 | Case 6 | Case 7 |
|--------|--------|--------|--------|--------|--------|--------|--------|
| User 1 | 3/9    | 4/9    | 4/9    | 3/9    | 2/9    | 3/9    | 2/9    |
| User 2 | 3/9    | 3/9    | 2/9    | 4/9    | 4/9    | 2/9    | 3/9    |
| User 3 | 3/9    | 2/9    | 3/9    | 2/9    | 3/9    | 4/9    | 4/9    |

FIG 11B

|    | I  | P1 | P2 | P3 | P4 | P5 | P6 | P7 | P8 | P9 | P10 | P11 | P12 | P13 | P14 |
|----|----|----|----|----|----|----|----|----|----|----|-----|-----|-----|-----|-----|
| CP | 43 | 7  | 7  | 7  | 6  | 5  | 8  | 6  | 7  | 7  | 6   | 6   | 4   | 5   | 5   |
| FM | 47 | 5  | 6  | 7  | 5  | 6  | 7  | 6  | 5  | 5  | 6   | 5   | 5   | 3   | 4   |
| MD | 50 | 1  | 2  | 3  | 3  | 3  | 4  | 4  | 4  | 5  | 6   | 8   | 10  | 12  | 14  |

APPARATUS AND METHOD FOR CONTROLLING AN OPERATION OF A PLURALITY OF COMMUNICATION LAYERS

CROSS-REFERENCE TO RELATED APPLICATION

This application is a continuation of copending International Application No. PCT/EP2003/011446, filed Oct. 15, 2003, which designated the United States, and was not published in English and is incorporated herein by reference in its entirety.

BACKGROUND OF THE INVENTION

1. Field of the Invention

The present invention is in the field of telecommunications and, in particular, in the field of communication systems using protocol layers for processing information to be transmitted and/or for processing received information.

2. Description of Prior Art

In mobile wireless communication environment it is a challenging task to provide reliable high-quality services due to a dynamic behavior of a communication link, for example of a wireless link. Therefore, system designers have to cope with a non-predictable variation of transmission quality resulting from time-varying resource availability, fading errors, outages or handover. For wireless networks beyond the third generation systems (B3G), this dynamic behavior will negatively be affected since B3G systems are expected to span across heterogeneous wireless access network technologies with different transmission characteristics. However, the next generation wireless networks are expected to provide reliable and transparent services to the customers so that a seamless use of the network's diversity can be achieved.

Service and application provisioning in B3G does not only have to regard network's density but also application diversity as new business models which are expected to allow third party providers to offer their application on top of the operators' service platforms making use of advanced open interfaces. In order to take dynamically changing application requirements into account, which may result e.g. from varying user preferences or varying user context, the operators will need an ability to dynamically change the systems parameters in order to react to the varying requirements.

Usually, conventional communication systems apply a plurality of communication layers arranged to a protocol stack for information processing. FIG. 9 shows a protocol stack comprising a plurality of hierarchically arranged communication layers. The prior art protocol stack shown in FIG. 9 is disclosed in Andrew Tannenbaum, Computer Networks, 4$^{th}$ Edition, Francis Hall, 2003.

The protocol stack comprises a physical layer 901, a data link layer 903 arranged above the physical layer 901, a network layer 905 arranged on top of the data link layer 903, a transport layer 907 arranged at top of the network layer 905, and an application layer 911 arranged at top of the transport layer 907.

Generally speaking, the application layer is operative for managing the information to be transmitted. For example, the information comprises a media data stream, for example a video data stream, as information to be transmitted through a communication channel. Alternatively, the information may comprise a multimedia data stream consisting of video and audio information, to be transmitted through the communication channel. Furthermore, the application may comprise an electronic mail, etc. In other words, the application layer is operative for transforming the application to be transmitted into a transmittable information stream.

The application layer 911 directly communicates with the transport layer 907 being operative for providing a transport service, so that the information can be transmitted to a destination sink in dependency of the physical network used for communication. For example, the transport layer appends a transport protocol data unit (TPDU) to the information data stream in order to preserve a peer-to-peer communication which is common in all communication networks. Peer-to-peer communication means that for example the transport layer 907 communicates directly with another transport layer implemented in a destination network.

The transport layer 907 communicates directly with the network layer 905 being operative for processing an information frame provided by the transport layer 907, so that an end-to-end communication, i.e. communication between two computer entities, is possible.

The network layer 905 provides a network layer frame to a link layer comprising the data link layer 903 and the physical layer 901, wherein the data link layer 903 and the physical layer 901 may comprise a plurality of sub-layers, for example a medium access control sub-layer.

The link layer is operative for managing the transmission of the information represented by bits through the communication channel. For example, the data link layer 903 is operative for applying a forward error correction encoding (FEC) or forward error detection encoding, for re-transmission of erroneous data frames (packets) and, for example, for confirming of a correct reception of each frame by sending an acknowledgement frame. Furthermore, the data link layer 903 may be operative for scheduling the frames to be transmitted in, for example, a multi-user scenario. Scheduling means, that a frame is transmitted at a predetermined time slot (transmission time frame).

The data link layer 903 directly communicates with the physical layer 901 being operative for further encoding the streams provided by the data link layer 903 by, for example, performing a modulation using a modulation scheme modulating a carrier according to the information to be transmitted.

The embodiment of the protocol stack shown in FIG. 9 corresponds to a TCP/IP reference model described in the above-referenced document (TCP=transmission control protocol, IP=internet protocol). For the sake of convenience it is to be noted, that the protocol stack shown in FIG. 9 also corresponds to the OSI reference model (OSI=open system interconnect) with exception of two layers, namely a session layer and a presentation layer arranged between the application layer 901 and the transport layer 907.

The internet protocol stack as depicted in FIG. 9 is expected to be used as a basic platform for B3G systems and applications. However, in order to achieve a good transmission quality, within a varying transmission environment, an efficient use of the available network resources is necessary in order to adapt the communication system or the application to come up, for example, to varying transmission characteristics and application requirements. For example, in case of a frequency-selective communication channel, a suitable encoding of the data bit stream to be transmitted is necessary, so that a predetermined bit error probability, i.e. $10^{-6}$, is not increased. To do so, the physical layer may be, for example, operative, to adapt the modulation scheme to the current channel characteristic. Accordingly, a system adaptation can be performed on all protocol layers of the protocol stack by adapting the respective parameters determining an operation mode of a respective communication layer.

Conventionally, the optimization of the system for a specific application, for example a video stream, is performed in a vertical manner in a system carrying only one service in a non-layered scenario, e.g. in a POTS system (POTS=Plain Old Telephony Service).

In layered communication systems, such as wireless internet, traditionally, certain layers are independently optimized for an expected worst case scenario (worst condition), which results in an inefficient use of the available communication resources, for example in available bandwidth, an achievable data rate associated with a certain bit error probability etc.

However, in existing systems, the intra-layer adaptation is performed without considering inter-layer dependencies. In P. A. Chou, and Z. Miao, "Rate-Distortion Optimization Streaming of Packetized Media", Technical Report MSR-TR-2001-35, Microsoft Research, Microsoft Corporation, February 2001, a communication system is disclosed, where a media frame scheduling is performed by the application layer, wherein only in inter-dependency of the media frames transporting video and audio information is taken into account. In M. Kalman, E. Steinbach, and B. Girod, "R-D Optimized Media Streaming Enhanced with Adaptive Media Playout", International Conference on Multimedia and Expo, ICME 2002, Lausanne, August 2002, an adaptive media playout scheme is described, where the playout speed of audio data (for example voice) and video data is varied as a function of channel conditions. In S. Saha, M. Jamtgaard, J. Villasenor, "Bringing the wireless Internet to mobile devices", Computer, vol. 34, issue 6, pp. 54-58, June 2001, an adaptive middle layer is described, that applies transcoding of media data in order to adapt the currently used coding scheme to varying channel conditions. In H. Imura et al., "TCP over Second (2.5G) and Third (3G) Generation Wireless Networks", IETF RFC 3481, February 2003, a wireless TCP protocol stack is described, that distinguishes between packet losses due to a network congestion and losses due to erasures on a wireless link. In F. H. Fitzek, and M. Reisslein, "A prefetching protocol for continuous media streaming in wireless environments", IEEE Journal on Selected Areas in Communications, vol. 19, no. 10, pp. 2015-2028, October 2001, a data link layer re-transmission is described, where a delay constraint is taken into account. The known differentiated services approached (DIFFSERV) is based on an established priority among media packets, so that more important media packets are preferably scheduled. Additionally, adaptive modulation and encoding on the physical layer is known, as for example described in the IEEE 802.11a standard.

However, the above indicated prior art approaches suffer from the fact, that only one layer is optimized with respect to fulfilling an optimization goal. For example, in order to improve a transmission quality, the physical layer may be operative to adaptively adjust the transmission power depending on a current channel condition, for example a current channel attenuation. In other words, the above indicated prior art approaches rely on an optimization of only one parameter set determining an operation mode of the respective communication layer.

In order to more efficiently exploit the resources, an adaptation of two layers can be performed. In K. Stuhlmüller, N. Färber, and B. Girod, "Analysis of video transmission over lossy channels", IEEE Journal on Selected Area in Communication, vol. 18, no. 6, pp. 1012-1032, June 2000, and T. Fingscheidt, T. Hindelang, R. V. Cox, N. Seshadri, "Joint Source-Channel (De)Coding for Mobile Communications", IEEE Transactions on Communications, Vol. 50, No. 2, pp. 200-212, February 2002, a source and channel coding scheme is described. The adaptation scheme is based on an adaptation of a source rate and code rate depending on the channel conditions in terms of transmission quality. To be more specific, an analytic formula is disclosed enabling a calculating of a source rate and of a channel rate.

In W. Yuan, K. Nahrstedt, S. Adve, D. Jones, R. Kravets: Design and Evaluation of a Cross-Layer Adaptation Framework for Mobile Multimedia Systems, to appear in SPIE/ACM Multimedia Computing and Networking Conference (MMCN) 2003, an optimization of power control and transmission data rate is disclosed. In S. Toumpis, A. Goldsmith: Performance, Optimization, and Cross-Layer Design of Media Access Protocols for Wireless Ad Hoc Networks, IEEE International Conference on Communications (ICC), 2003 a medium access control (MAC) layer and physical layer optimization for ad hoc networks are described.

However, the prior art concepts applying cross-layer design for optimization purposes suffer from a disadvantage, that, within the communication system, only a certain optimization approach is considered for the intra-layer adaptation. Moreover, the prior art approaches do not consider inter-layer dependencies which results in an ineffective exploitation of the available resources.

A further disadvantage of the prior art approaches is that the disclosed optimization schemes are not flexible. Since the prior art approaches indicated above only consider one or two certain parameters for optimization, for example power control and transmission data rate, further optimization scenarios are not considered in order to fully exploit the available communication resources.

SUMMARY OF THE INVENTION

It is the object of the present invention to provide a concept for an efficient cross-layer optimization for layered communication systems.

In accordance with a first aspect, the invention provides an apparatus for controlling an operation of a plurality of communication layers in a layered communication system, the layered communication system transmitting information through a communication channel, wherein the information has a first information associated with a first user and a second information associated with a second user in a multi-user scenario, wherein an operation of a first communication layer of the plurality of communication layers is determined by a first set of parameters, and wherein an operation of a second communication layer of the plurality of communication layers is determined by a second set of parameters, wherein the first communication layer is operative for encoding the first information to obtain a first information signal and for encoding the second information to obtain a second information signal, wherein the second communication layer is operative for encoding the first information signal and the second information signal to obtain a composite signal to be transmitted through the communication channel, the apparatus having:

a provider for providing a property of the communication channel;

a storage element for storing a first plurality of sets of parameters defining different operation modes of the first communication layer and for providing a second plurality of sets of parameters defining different operation modes of the second communication layer;

a selector for selecting a first set of parameters from the first plurality of sets of parameters, and for selecting the second set of parameters from the second plurality of sets of parameters, wherein the selector is operative for selecting the first set of parameters and the second set of parameters in dependence of the channel property and an optimization goal, wherein the optimization goal is an optimized transmission quality for the first information and for the second information, and wherein the selector is operative for jointly selecting the first set of parameters to be used by the first communication layer for encoding the first information and the second information, and the second set of parameters to be used by the second communication layer for encoding the first information signal and the second information signal to optimize the transmission quality of the first information and of the second information; and a provider for providing the first set of parameters to the first communication layer and the second set of parameters to the second communication layer.

In accordance with a second aspect, the invention provides a communication apparatus for processing an information to be transmitted in accordance with a transmission protocol, the transmission protocol having a plurality of protocol layers, the communication apparatus having:

an information source for providing the information;

the apparatus for controlling an operation of a plurality of communication layers in a layered communication system, the layered communication system transmitting information through a communication channel, wherein the information has a first information associated with a first user and a second information associated with a second user in a multi-user scenario, wherein an operation of a first communication layer of the plurality of communication layers is determined by a first set of parameters, and wherein an operation of a second communication layer of the plurality of communication layers is determined by a second set of parameters, wherein the first communication layer is operative for encoding the first information to obtain a first information signal and for encoding the second information to obtain a second information signal, wherein the second communication layer is operative for encoding the first information signal and the second information signal to obtain a composite signal to be transmitted through the communication channel, the apparatus having:

a provider for providing a property of the communication channel;

a storage element for storing a first plurality of sets of parameters defining different operation modes of the first communication layer and for providing a second plurality of sets of parameters defining different operation modes of the second communication layer;

a selector for selecting a first set of parameters from the first plurality of sets of parameters, and for selecting the second set of parameters from the second plurality of sets of parameters, wherein the selector is operative for selecting the first set of parameters and the second set of parameters in dependence of the channel property and an optimization goal, wherein the optimization goal is an optimized transmission quality for the first information and for the second information, and wherein the selector is operative for jointly selecting the first set of parameters to be used by the first communication layer for encoding the first information and the second information, and the second set of parameters to be used by the second communication layer for encoding the first information signal and the second information signal to optimize the transmission quality of the first information and of the second information; and a provider for providing the first set of parameters to the first communication layer and the second set of parameters to the second communication layer, for controlling the plurality of protocol layers;

a processor for processing the information in accordance with the protocol layers.

In accordance with a third aspect, the invention provides a communication apparatus for processing a received signal in accordance with a reception protocol, the received signal being a received version of a transmit signal transmitted through a communication channel, the transmit signal having an information processed in accordance with a transmission protocol, wherein the transmission protocol has a first transmission protocol layer and a second transmission protocol layer, wherein an operation mode of the first transmission protocol layer is determined by a first set of transmission parameters, wherein an operation mode of the second transmission protocol layer is determined by a second set of transmission parameters, wherein the first set of transmission parameters and the second set of transmission parameters are pair-wise selected from a plurality of transmission parameters in dependence on a property of the communication channel, wherein the reception protocol has a first reception protocol layer and a second reception protocol layer, wherein an operation mode of the first reception protocol layer is determined by a first set of reception parameters, and wherein an operation mode of the second reception protocol layer is determined by a second set of reception parameters, the apparatus having:

a storage element for storing a plurality of sets of reception parameters, each set of reception parameters corresponding to a set of transmit parameters;

a provider for providing a transmission protocol information indicating the pair of the first and second set of transmission parameters used for processing the information before transmitting the information;

a selector for selecting a pair consisting of the first set of reception parameters and the second set of reception parameters corresponding to the pair of the first and the second set of transmission parameters on the basis of the transmission protocol information;

a provider for providing a pair of the first set of reception parameter and the second set of reception parameter to the first reception protocol layer and to the second reception protocol layer;

a processor for processing the receive signal in accordance with the reception protocol to obtain the information.

In accordance with a fourth aspect, the invention provides a method for controlling an operation of a plurality of communication layers in a layered communication system, the layered communication system transmitting information through a communication channel, wherein the information has a first information associated with a first user and a second information associated with a second user in a multi-user scenario, wherein an operation of a first communication layer of the first plurality of communication layers is determined by a first set of parameters, and wherein a operation of a second communication layer of the plurality of communication layers is determined by a second set of parameters, wherein the first communication layer is operative for encoding the first information to obtain a first information signal and for encoding the second information to obtain a second information signal, wherein the second communication layer is operative for encoding the first information signal and the second information signal to obtain a composite signal to be transmitted through the communication channel, the method including the steps of:

providing a property of the communication channel;

storing a first plurality of sets of parameters defining different operation modes of the first communication layer;

providing a second plurality of sets of parameters defining different operation modes of the second communication layer;

jointly selecting the first set of parameters from the first plurality of sets of parameters and the second set of parameters from the second plurality of sets of parameters in dependence on the channel property and an optimization goal, the first set of parameters to be used by the first communication layer for encoding the first information and the second information, and the second set of parameters to be used by the second communication layer for encoding the first information signal and the second information signal to optimize the transmission quality of the first information and of the second information, wherein the optimization goal is an optimized transmission quality for the first information and for the second information;

providing the first set of parameters to the first communication layer and the second set of parameters to the second communication layer.

In accordance with a fifth aspect, the invention provides a method for processing an information to be transmitted in accordance with a transmission protocol, the transmission protocol having a plurality of protocol layers, the method including the steps of:

providing the information;

controlling the plurality of protocol layers in accordance with the method for controlling an operation of a plurality of communication layers in a layered communication system, the layered communication system transmitting information through a communication channel, wherein the information has a first information associated with a first user and a second information associated with a second user in a multi-user scenario, wherein an operation of a first communication layer of the first plurality of communication layers is determined by a first set of parameters, and wherein a operation of a second communication layer of the plurality of communication layers is determined by a second set of parameters, wherein the first communication layer is operative for encoding the first information to obtain a first information signal and for encoding the second information to obtain a second information signal, wherein the second communication layer is operative for encoding the first information signal and the second information signal to obtain a composite signal to be transmitted through the communication channel, the method including the steps of:

providing a property of the communication channel;

storing a first plurality of sets of parameters defining different operation modes of the first communication layer;

providing a second plurality of sets of parameters defining different operation modes of the second communication layer;

jointly selecting the first set of parameters from the first plurality of sets of parameters and the second set of parameters from the second plurality of sets of parameters in dependence on the channel property and an optimization goal, the first set of parameters to be used by the first communication layer for encoding the first information and the second information, and the second set of parameters to be used by the second communication layer for encoding the first information signal and the second information signal to optimize the transmission quality of the first information and of the second information, wherein the optimization goal is an optimized transmission quality for the first information and for the second information;

providing the first set of parameters to the first communication layer and the second set of parameters to the second communication layer;

processing the information in accordance with the protocol layer.

In accordance with a sixth aspect, the invention provides a method for processing a received signal in accordance with a reception protocol, the received signal being a received version of a transmit signal transmitted through a communication channel, the transmit signal having an information processed in accordance with a transmission protocol, wherein the transmission protocol has a first transmission protocol layer and a second transmission protocol layer, wherein an operation mode of the first transmission protocol layer is determined by a first set of parameters, wherein an operation mode of the second transmission protocol layer is determined by a second set of transmission parameters, wherein the first set of transmission parameters and the second set of transmission parameters are pair-wise selected from a plurality of transmission parameters in dependence on a property of the communication channel, wherein the reception protocol has a first reception protocol layer and a second reception protocol layer, wherein an operation mode of the first reception protocol layer is determined by a first set of reception parameter, and wherein an operation mode of the second reception protocol layer is determined by a second set of reception parameters, the method including the steps of:

storing a plurality of sets of reception parameters, each set of reception parameters corresponding to a set of transmission parameters;

providing a transmission protocol information indicating the pair of first and second set of transmission parameters used for processing the information before transmitting the information;

selecting a pair consisting of the first set of reception parameters and the second set of reception parameters corresponding to the pair of the first and second set of transmission parameters on the basis of the transmission protocol information;

providing the pair of the first set of reception parameters and the second set of reception parameters to the first reception protocol layer and to the second reception protocol layer;

processing the received signal in accordance with the reception protocol to obtain the information.

In accordance with a seventh aspect, the invention provides a computer program having a program code for performing the method for controlling an operation of a plurality of communication layers in a layered communication system, the layered communication system transmitting information through a communication channel, wherein the information has a first information associated with a first user and a second information associated with a second user in a multi-user scenario, wherein an operation of a first communication layer of the first plurality of communication layers is determined by a first set of parameters, and wherein a operation of a second communication layer of the plurality of communication layers is determined by a second set of parameters, wherein the first communication layer is operative for encoding the first information to obtain a first information signal and for encoding the second information to obtain a second information signal, wherein the second communication layer is operative for encoding the first information signal and the second information signal to obtain a composite signal to be transmitted through the communication channel, the method including the steps of:

providing a property of the communication channel;
storing a first plurality of sets of parameters defining different operation modes of the first communication layer;
providing a second plurality of sets of parameters defining different operation modes of the second communication layer;
jointly selecting the first set of parameters from the first plurality of sets of parameters and the second set of parameters from the second plurality of sets of parameters in dependence on the channel property and an optimization goal, the first set of parameters to be used by the first communication layer for encoding the first information and the second information, and the second set of parameters to be used by the second communication layer for encoding the first information signal and the second information signal to optimize the transmission quality of the first information and of the second information, wherein the optimization goal is an optimized transmission quality for the first information and for the second information;
providing the first set of parameters to the first communication layer and the second set of parameters to the second communication layer, when the program runs on a computer.

In accordance with a eighth aspect, the invention provides a computer program having a program code for performing the method for processing an information to be transmitted in accordance with a transmission protocol, the transmission protocol having a plurality of protocol layers, the method including the steps of:
providing the information;
controlling the plurality of protocol layers in accordance with the method for controlling an operation of a plurality of communication layers in a layered communication system, the layered communication system transmitting information through a communication channel, wherein the information has a first information associated with a first user and a second information associated with a second user in a multi-user scenario, wherein an operation of a first communication layer of the first plurality of communication layers is determined by a first set of parameters, and wherein a operation of a second communication layer of the plurality of communication layers is determined by a second set of parameters, wherein the first communication layer is operative for encoding the first information to obtain a first information signal and for encoding the second information to obtain a second information signal, wherein the second communication layer is operative for encoding the first information signal and the second information signal to obtain a composite signal to be transmitted through the communication channel, the method including the steps of:
providing a property of the communication channel;
storing a first plurality of sets of parameters defining different operation modes of the first communication layer;
providing a second plurality of sets of parameters defining different operation modes of the second communication layer;
jointly selecting the first set of parameters from the first plurality of sets of parameters and the second set of parameters from the second plurality of sets of parameters in dependence on the channel property and an optimization goal, the first set of parameters to be used by the first communication layer for encoding the first information and the second information, and the second set of parameters to be used by the second communication layer for encoding the first information signal and the second information signal to optimize the transmission quality of the first information and of the second information, wherein the optimization goal is an optimized transmission quality for the first information and for the second information;
providing the first set of parameters to the first communication layer and the second set of parameters to the second communication layer;
processing the information in accordance with the protocol layer, when the program runs on a computer.

In accordance with a ninth aspect, the invention provides a computer program having a program code for performing the method for processing a received signal in accordance with a reception protocol, the received signal being a received version of a transmit signal transmitted through a communication channel, the transmit signal having an information processed in accordance with a transmission protocol, wherein the transmission protocol has a first transmission protocol layer and a second transmission protocol layer, wherein an operation mode of the first transmission protocol layer is determined by a first set of parameters, wherein an operation mode of the second transmission protocol layer is determined by a second set of transmission parameters, wherein the first set of transmission parameters and the second set of transmission parameters are pair-wise selected from a plurality of transmission parameters in dependence on a property of the communication channel, wherein the reception protocol has a first reception protocol layer and a second reception protocol layer, wherein an operation mode of the first reception protocol layer is determined by a first set of reception parameter, and wherein an operation mode of the second reception protocol layer is determined by a second set of reception parameters, the method including the steps of:
storing a plurality of sets of reception parameters, each set of reception parameters corresponding to a set of transmission parameters;
providing a transmission protocol information indicating the pair of first and second set of transmission parameters used for processing the information before transmitting the information;
selecting a pair consisting of the first set of reception parameters and the second set of reception parameters corresponding to the pair of the first and second set of transmission parameters on the basis of the transmission protocol information;
providing the pair of the first set of reception parameters and the second set of reception parameters to the first reception protocol layer and to the second reception protocol layer;
processing the received signal in accordance with the reception protocol to obtain the information, when the program runs on a computer.

The present invention is based on the finding, that an efficient cross-layer adaptation can be performed, when, depending on a channel property and an optimization goal, a plurality of sets of parameters, each set of parameters determining an operation mode of a particular communication layer, is jointly determined. Therefore, a joint adaptation of multiple layers can be performed to achieve the optimization goal, comprising for example a maximization of a user perceived quality while efficiently using communication resources.

Since the inventive approach is directed to the optimization of an operation of communication layers embedded within a protocol stack, inter-layer dependencies can explicitly be taken into account.

In accordance with the present invention, a storage element is provided for storing (or providing) the first plurality of sets of parameters defining different operation modes of a first communication layer of a plurality of communication layers, and for providing a second plurality of sets of parameters defining different operation modes of the second communication layer. In order to perform a cross-layer optimization, the inventive concept provides a selector for selecting the first set of parameters from the first plurality of sets of parameters and for selecting the second set of parameters from the second plurality of sets of parameters. Since the first communication layer and the second communication layer can freely be chosen in order to achieve an optimization goal, for example a transmission quality at a current channel condition (i.e. a current bit error probability), a flexible optimization scheme can be performed, wherein inter-layer dependencies can explicitly be taken into account.

Since the inventive selector is operative for selecting the first and second set of parameters defining the respective operation mode of the respective communication layer in dependence of the optimization goal, a considerable degree of freedom with respect to possible optimization scenarios can be achieved. For example, starting from the optimization goal and the current channel condition, the selector may be operative for deciding which communication layer are to be jointly optimized in order to achieve the optimization goal.

For example, the first communication layer comprises the application layer, and the second communication layer comprises a data link layer and a physical layer, as is depicted in FIG. 9. If, for example an image information is to be transmitted, then the first communication layer may be operative to encode the image information to achieve a certain data compression associated with an allowable distortion describing a difference between a transmitted and a received information. Hence, the compressed image information has an information rate which is a minimum achievable information rate with respect to the transmission of the image information without exceeding the predetermined distortion value. In this case, the optimization goal is an optimization of a transmission quality to transmit the information with the information data rate without exceeding the predetermined distortion value. To achieve this optimization goal, the inventive selector may jointly optimize the application layer and the link layer consisting of the data link layer and of the physical layer.

In order to transmit the compressed image information, the bits representing the information have to be encoded so that a certain channel data rate associated with a certain bit error probability, ideally supporting the minimum information rate associated with the distortion, is achieved. To do so, the inventive selector selects a first set of parameters to be used by the application layer for encoding, i.e. source encoding, and selects the second set of parameters for managing a physical transmission of the information through a communication channel. The second set of parameters may, for example, comprise a subset of encoding parameters to be used for performing a forward error correction encoding scheme, for example a Reed-Solomon encoding or a convolutional encoding. Additionally, the second set of parameters may comprise a subset of physical layer parameters determining a modulation scheme, for example a quadrature amplitude modulation (QAM) or phase-shift keying (PSK).

However, a data frame provided by the physical layer for transmission not only comprises the information but also comprises information header introduced by every communication layer in order to establish the previously mentioned peer-to-peer communication. In other words, not only the information to be transmitted by the application layer and the subsequent encoding of the information determine the channel data rate. However, only a certain amount of information bits can be transmitted within the transmittable information frame. Moreover, each communication layer receives a processed information from a communication layer arranged above, performs a further processing, and passes the further process information to a following communication layer. In order to process the information in accordance with the protocol stack, certain agreements are to be made between the communication layers, for example a maximum allowable length of a forwarded data frame. Since the inventive selector operates on the communication layers, the above-indicated inter-layer dependencies can explicitly be taken into account, so that the available communication resources (for example the available bandwidth) can be efficiently used.

It is a further advantage of the present invention, that the inventive optimization approach can be applied to achieving a plurality of optimization goals, since the parameters determining the operation modes of communication layers. In particular, the inventive concept can be applied to cross-layer optimization in a multi-user transmission scenario. In this case, the optimization goal is an optimization of a transmission quality per user. In order to achieve the optimization goal, each user stream can explicitly be taken into account. For example, the first set of parameters determining the operation mode of the first communication layer (for example application layer) can be chosen such that the first user information is compressed independently from a second user information. Moreover, the obtained user stream can efficiently be scheduled by selecting the second set of parameters determining the operation mode of the second communication layer, which may be a link layer as depicted in FIG. 9. Hence, the inventive joint optimization of the application layer source rate selection and of the adaptive data link and the physical layer transmission scheduling in dependency of the channel property in a multi-user communication system can be achieved.

Moreover, even a scheduling of the information streams associated with the first user can be performed within the application layer. For example, the information to be transmitted is a video or an audio stream represented by a media data. An application layer media data scheduling is a process of deciding which data segment within one session has to be transmitted at what time, while data link and physical layer transmission scheduling determines which user is allowed to use the channel at a given time, frequency or code, and, which modulation and channel encoding scheme is to be used for a user. The inventive optimization scheme considers the set of different transmission states on the data link and physical layer (i.e. modulation scheme, channel code rate, support of re-transmissions etc.) together with a distortion and source rate information, i.e. about media data from the application layer. In order to achieve the optimization goal, i.e. an optimum transmission strategy for each user and for each media data segment, the inventive selector may select the first set of parameters and the second set of parameters, so that an optimum transmission strategy is determined.

The inventive apparatus (optimizer) considers for example a partition of channel resources among multiple users which may result in different data rates for each user. Furthermore, a selection of different modulation or channel coding schemes can be applied, which may result in different packet loss rates and data rates associated with each user. In order to efficiently manage the transmission, a selective re-transmission of lossy frames together with a selective link layer acknowledgement can be formed. In order to manage the information to be transmitted, the information source rate (for example media source rate) can be selected. For individual user, an information about a signal to noise ratio (SNR) may be provided. Furthermore, even a relative importance of the information packet (media packet) may be taken into account, which results from inter-packet dependencies such as in modern video compression schemes (MPEG, H.26x). The relative importance is determined by the influence of a lost media frame on the overall reconstruction quality at the receiver when using a decoding scheme for the decompression.

The inventive apparatus may further consider a data rate information in terms of a packet size for selected information data units (i.e. media data units). Moreover, even a retransmission of important media data can be obtained by appropriately controlling an operation mode of the application thereby selecting the first set of parameters.

In accordance with the present invention, the optimum transmission strategy can be achieved by optimization of an objective function, which can be a cost function. The objective function can express, for instance, a maximization of the user perceived quality of a user experiencing the worst channel conditions among the users sharing the same communication resources, for example the same communication channel.

A further advantage of the inventive concept is a better utilization of communication resources, for example wireless network resources, when compared to other prior art approaches. Moreover, the inventive approach allows supporting of more simultaneous users in the same system since the available communication resources are efficiently exploited. In the case of the same number of users, an improved transmission quality per user can be achieved. Moreover, the user perceived quality can more equally be distributed among multiple users. Additionally, the present invention provides a concept for a dynamic adaptation of the communication system by optimization of the operation modes of the communication layers in order to take varying transmission characteristics and application requirements at the same time into account.

An optimization scheme used for optimization of a communication system using communication layers (protocol layers), i.e. B3G systems, is cross-layer design. Here several layers of the protocol stack spanning from application parameters to physical transmission are considered. FIG. 10 shows an embodiment of a communication system, where an optimization of the communication system on the basis of cross-layer optimization in a vertical manner for one specific application is demonstrated.

The system shown in FIG. 10 comprises a sender 1001 (base station) and a receiver 1003. The sender 1001 applies a protocol stack 1005 for processing the application (information) to be transmitted. The protocol stack 1005 comprises an application layer, a transport layer, a network layer, and a link layer, comprising, for example, a medium access control layer (MAC) and a physical layer (PHY). Accordingly, the receiver 1003 applies a protocol stack 1007 for processing a receive signal being a version of a transmit signal transmitted by the sender 1001. The protocol stack 1007 (the receive protocol stack) comprises, accordingly, a link layer, an IP layer (corresponding to the network layer), a TCP/UDP layer (corresponding to the transport layer), and an application layer.

FIG. 10 also demonstrates a peer-to-peer communication principle, where the corresponding layers, for example the transport layers and the TCP/UDP layer communicate with each other.

In order to optimize the system for the specific application, a bottom up information delivery is performed. For example, the link layer extracts a channel property as a physical restriction parameter, for example a signal to noise ratio (SNR) or a maximum possible transmit power. The physical restriction parameters are then transported to the application layer, where video streaming using real-time coding- and encoding schemes (codec) is performed. In other words, the application layer adapts the real-time codec to the physical restriction parameters so that the required transmission quality for video streaming can be achieved.

Accordingly, the application layer may inform the link layer about quality of service (QOS) requirements (for example a certain bit error probability associated with a certain service). In this case, the link layer may apply a more comprehensive encoding scheme so that the quality of service requirement is fulfilled.

The cross-layer adaptation technique is based on inter-layer information exchange across the traditional layers of the protocol stack to adapt the system parts to a dynamically changing environment. As mentioned above, the information travels in both directions, up and down the protocol stack. Cross-layer information exchange means, that the application receives information from lower layers (for example the link layer) about the current network conditions and predictable events influencing the transmission quality, i.e. handover. Accordingly, the lower layers may receive information about the current transmission requirements of the application, as discussed above.

BRIEF DESCRIPTION OF THE DRAWINGS

Further embodiments of the present invention are described in detail with respect to the following figures, in which:

FIG. 6 demonstrates transmission time arrangements in a multi-user scheduling approach;

FIG. 8 demonstrates a performance of the inventive apparatus for controlling an operation of a plurality of communication layers with respect to a maximization of a transmission quality of a worst performing user;

FIG. 11a shows a multi-user scheduling with different time arrangements;

FIG. 11b shows a size (in terms of packets) for a group of pictures in 3 measured videos;

DESCRIPTION OF PREFERRED EMBODIMENTS

Figure 1:
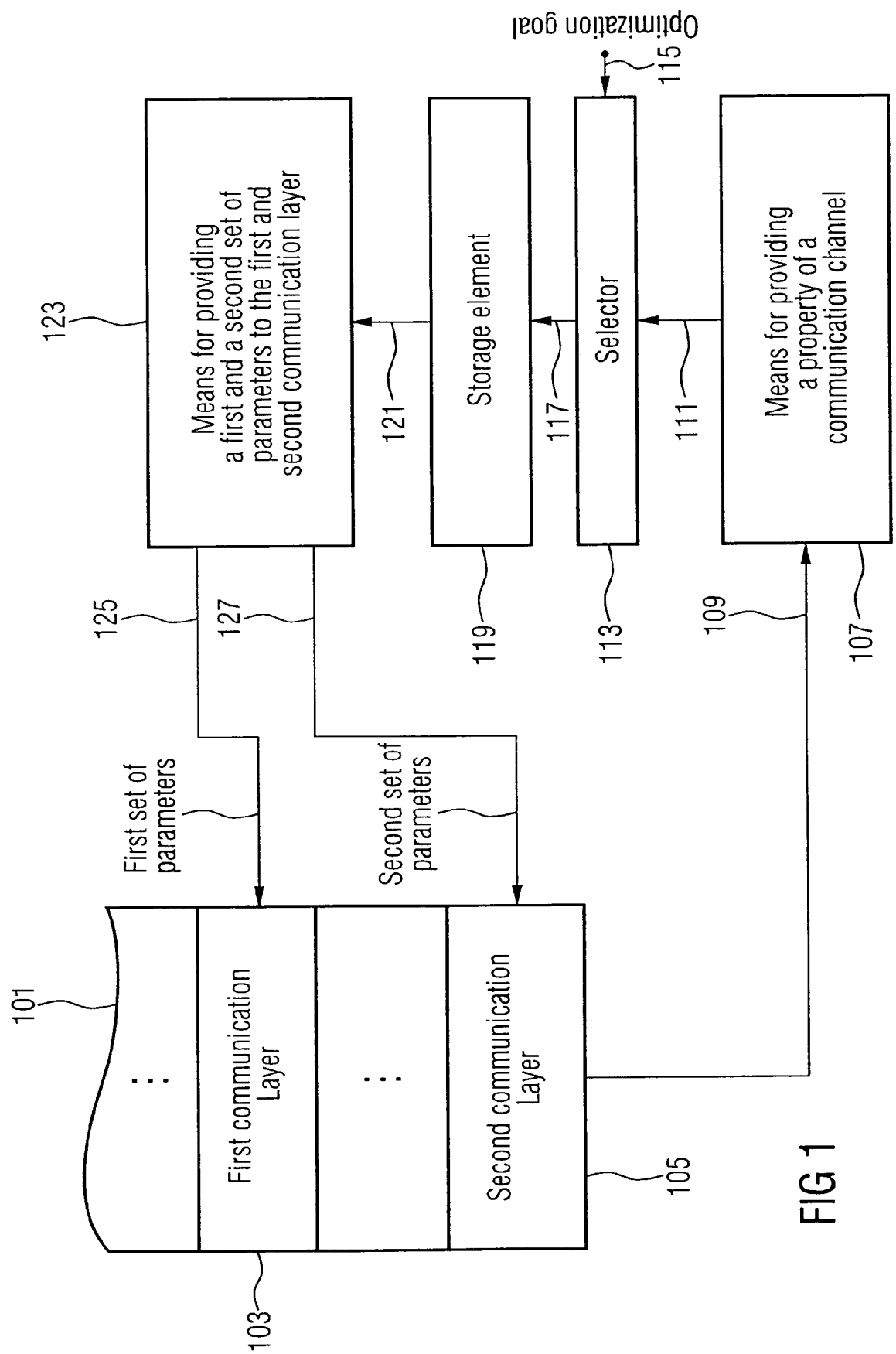
FIG. 1 shows a block diagram of an inventive apparatus for controlling an operation of a plurality of communication layers in accordance with a first embodiment of the present invention.

FIG. 1 shows an apparatus for controlling an operation of a plurality of communication layers in accordance with a first embodiment of the present invention.

The apparatus shown in FIG. 1 comprises a plurality of communication layers of a communication protocol stack 101, wherein a first communication layer 103 and a second communication layer 105 are explicitly depicted. The apparatus further comprises means 107 for providing a property of a communication channel, wherein the means 107 for providing the property has an input 109 and an output 111. The means 107 for providing the property is coupled to the second communication layer 105 via the input 109. The output 111 of the means 107 for providing the property is coupled to a selector 113 having a further input 115 and an output 117. The output 117 of the selector 113 is coupled to a storage element 119. The storage element 119 has an output 121 coupled to a means 123 for providing a first parameter set and a second parameter set to the first and second communication layer. The means 123 for providing the first and second parameter set has a first output 125 coupled to the first communication layer 103, and a second output 107 coupled to the second communication layer 105.

The apparatus shown in FIG. 1 is operative for controlling an operation of the plurality of communication layers comprised by the protocol stack 101 in a layered communication system. The layered communication system is operative for transmitting information through a communication channel to a remote communication system. As mentioned above, an operation of the first communication layer 103 of the plurality of communication layers is determined by the first set of parameters and an operation of the second communication layer 105 of the plurality of communication layers is determined by the second set of parameters. The first set of parameters and the second set of parameters are provided by the means 103 for providing the first and second set of parameters in order to control the operation of the communication protocol stack in dependence of a channel property and of an optimization goal.

In order to perform an adaptation, the storage element 119 comprises a first plurality of sets of parameters defining different operation modes of the first communication layer, and a second plurality of sets of parameters defining different operation modes of the second communication layer. The inventive selector 113 is coupled to the storage element 119 for selecting the first set of parameters from the first plurality of sets of parameters and for selecting the second set of parameters from the second plurality of sets of parameters. In particular, the selector 119 is operative for selecting the first set of parameters and for selecting the second set of parameters in dependence of the channel property provided by the means 107 for providing the property and in dependence of an optimization goal provided via the input 115 to the selector 113.

In order to control the operation of the plurality of communication layers, the means 103 for providing the first and second set of parameters receives the first and second set of parameters from the storage element 119, wherein the first and second set of parameters are selected by the selector 113 in order to achieve the optimization goal.

The second communication layer 105 may be operative for managing a transmission of the information through the communication channel. To do so, the second communication layer 105 may comprise a physical layer being further operative for extracting the property of the communication channel. The property of the communication channel may be a bit error probability, a signal to noise ratio (SNR), a available channel data rate associated with a certain bit error probability, a transmission delay, a transmission power associated with a bit error probability, a channel coherence time or a channel coherence bandwidth or a combination thereof. In order to provide the channel property to the selector, the means 107 for providing the property is coupled to the second communication layer 105 for receiving the property of the communication channel. As mentioned above, the second communication layer 105 may comprise a physical layer, to which the means 107 for providing the property is coupled. In order to receive the channel property from the physical layer, the means 107 for providing the property may further comprise a protocol interface for interfacing with the physical layer.

As mentioned above, the selector 113 is operative for selecting the first set of parameters and the second set of parameters. Preferably, the selector 113 is operative for jointly selecting the first and second set of parameters as a pair of parameters in order to simultaneously control an operation mode of the first and of the second communication layer. In other words, the selector 113 jointly selects the first and the second set of parameters, so that the optimization goal provided via the input 115 can be achieved, wherein the inter-layer dependencies are explicitly taken into consideration.

For example, the storage element 119 may be operative for storing or, generally, for providing the first and second plurality of sets of parameters, from which the first set of parameters and the second set of parameters can jointly be selected, so that the inter-layer dependency is taken into account.

Figure 9:
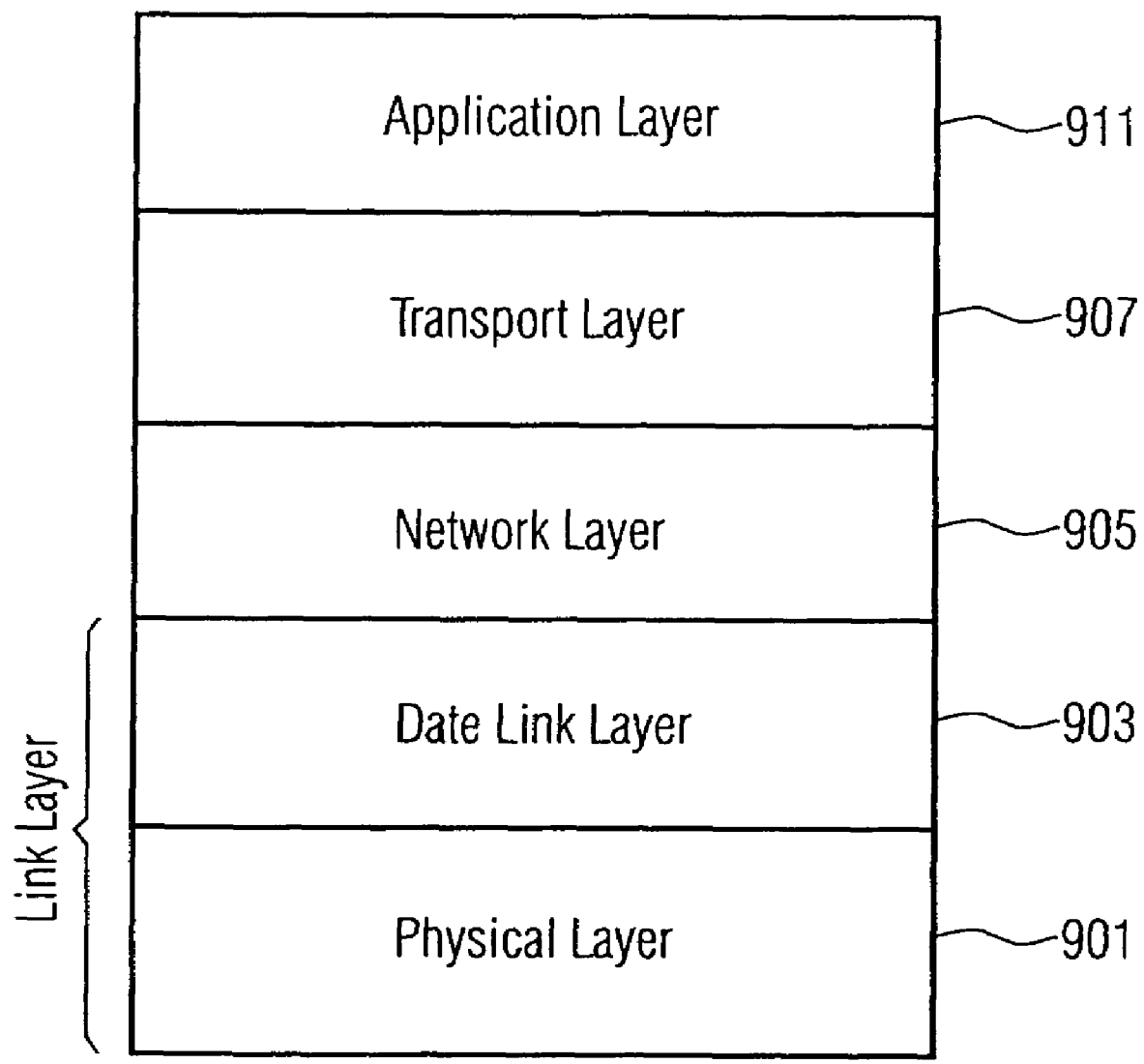
FIG. 9 shows a protocol stack.
Figure 10:
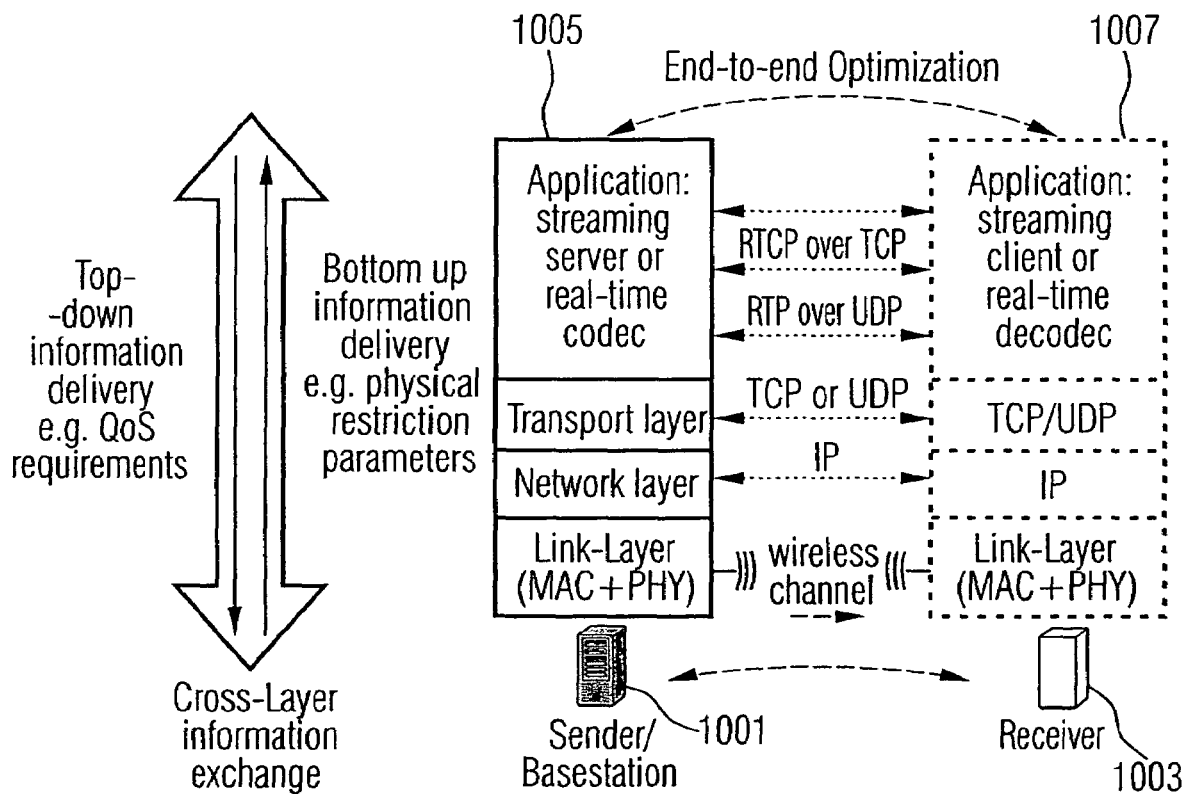
FIG. 10 shows a cross-layer design principle.

Generally, the first set of parameters may comprise a plurality of sets of parameters for controlling the whole operation mode of the first communication layer 103. Accordingly, the second set of parameters selectable by the selector 113 may comprise a plurality of sub-sets of parameters, wherein each sub-set of parameters of the second set of parameters determines a certain sub-operation mode of the second communication layer. By the way of example, the second communication layer 105 may comprise the data link layer and the physical layer, as depicted in FIG. 9. In this case, the second set of parameters may comprise a data link layer sub-set of parameters for controlling the operation mode of the data link layer, and a physical layer sub-set of parameters for controlling an operation mode (sub-operation) of the physical layer. In this way, scheduling (which is a certain form of encoding) and a further encoding, i.e. by applying a forward error correction encoding scheme, can be determined.

Simultaneously, the sub-operation mode of the physical layer can be controlled by the physical layer sub-set of parameters. For example, the physical layer sub-set of parameters determines a modulation scheme applied to modulation of the data frame prior to transmission. Simultaneously, the first set of parameters determines the operation mode of the first communication layer 103 which can be, for example, the above-discussed application layer. In this case, the first set of parameters controls a data compression encoding scheme associated with a certain rate distortion characteristic. Since the first set of parameters and the second set of parameters are jointly selected for controlling the operation mode of the first and of the second communication layer, a global optimization with respect to the optimization goal and to the current channel condition can be achieved, so that all available, controllable, communication resources can jointly be optimized.

As mentioned-above, the storage element 119 is operative for storing the first and the second plurality of sets of parameters defining different operation modes of the first and of the second communication layer. For example, the first plurality of sets of parameters and the second plurality of sets of parameters are pre-computed, for example by optimization over a plurality of scenarios, wherein the optimization may be performed by an external computer entity. In other words, the storage element 119 may comprise jointly optimized sets of parameters to be used in different scenarios. An advantage of this approach is, that an adaptation of the protocol stack can be performed dynamically, i.e. during a transmission operation. A further advantage of this approach is, that the adaptation process may be performed quickly, since, depending on the channel property and on the optimization goal, the selector 113 may directly select the actually optimized pair consisting of the first and second set of parameters.

Figure 2:
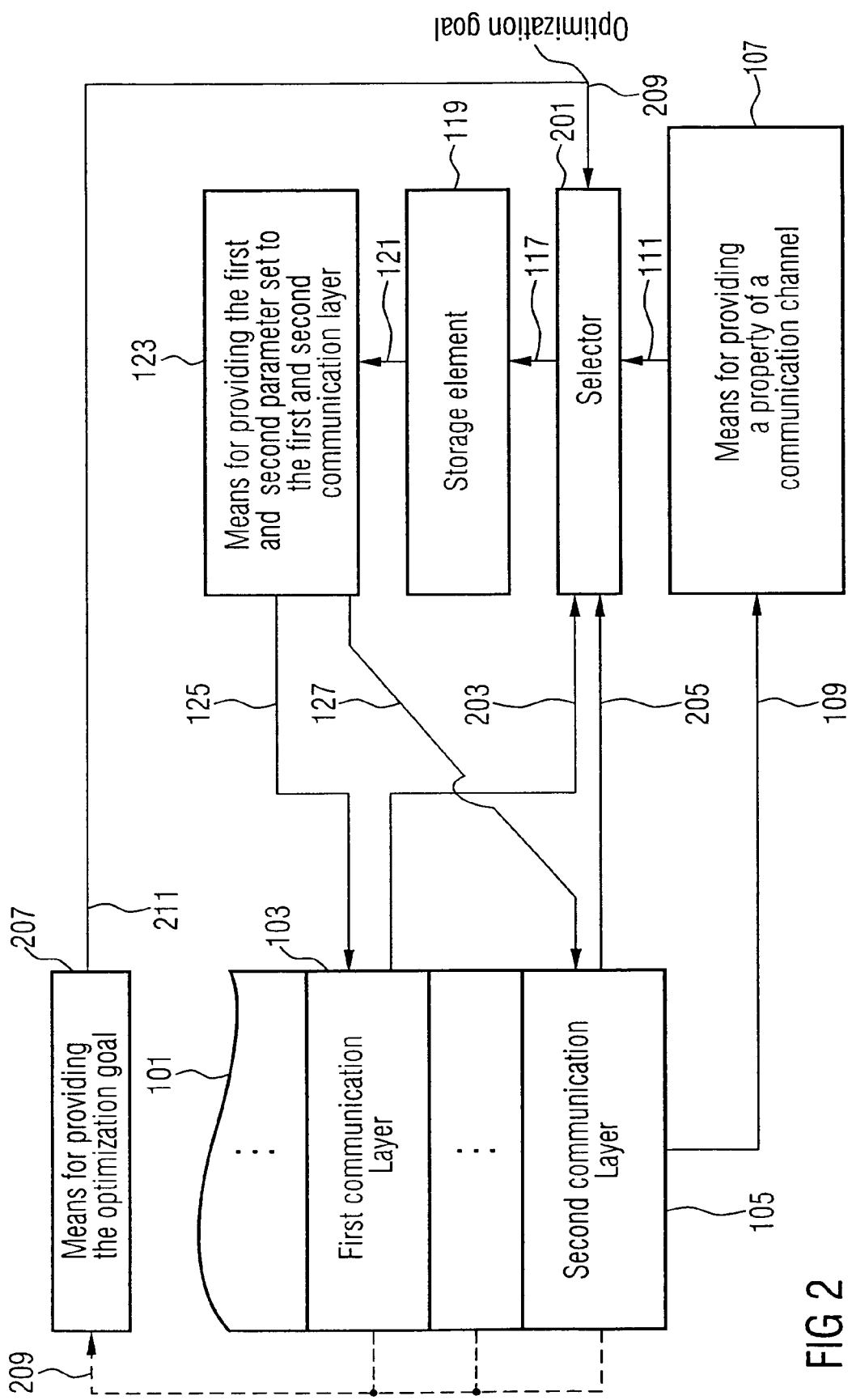
FIG. 2 shows a block diagram of an inventive apparatus for controlling an operation of a plurality of communication layers in accordance with a further embodiment of the present invention.

FIG. 2 shows a block diagram of an apparatus for controlling an operation of a plurality of communication layers in accordance with a further embodiment of the present invention.

Unlike the apparatus shown in FIG. 1, the apparatus of FIG. 2 comprises a selector 201 having, additionally, a first input 203 and a second input 205. The first communication layer 103 is coupled via the first input 203 to the selector 201. Accordingly, the second communication layer 105 is coupled via the second input 205 to the selector 201.

Additionally, the apparatus shown in FIG. 2 comprises a means 207 for providing the optimization goal. The means 207 for providing the optimization goal has an input 209 coupled to a plurality of communication layers, as is indicated in FIG. 2. Furthermore, the means 207 for providing the optimization goal comprises an output 211 coupled to a further input 209 of the selector 201.

The selector 201 is coupled to the first and to the second communication layers for monitoring a current status of the protocol stack 101. In particular, the selector 201 may comprise a decision element for monitoring a current status of the first communication layer, wherein the current status of the first communication layer is determined by a current first set of parameters, i.e. the set of parameters currently determining an operation mode of the first communication layer. Accordingly, the decision element of the selector 201 is operative for monitoring a current status of the second communication layer determined by a current second set of parameters. Depending on the current statuses, the optimization goal and the channel property, the decision element may be further operative for generating a control information indicating, whether the optimization goal can be achieved using the current first and second set of parameters or whether the current first set of parameters and the current second set of parameters should be replaced. In particular, the control information provided by the decision element may indicate, that the first set of parameters and/or the second set of parameters are to be selected by the selector 201 in order to achieve the optimization goal, when the optimization goal cannot be achieved by the current first and second set of parameters.

As indicated in FIG. 2, the means 207 for providing the optimization goal may be coupled to the plurality of communication layers for receiving the optimization goal. The optimization goal may be, for example, an application oriented optimization goal, for example a certain quality of service provided by the first communication layer, when the first communication layer is an application layer. In this case, the means 207 for providing the optimization goal is coupled to the application layer for receiving the application oriented optimization goal.

Accordingly, the optimization goal may comprise an optimization of a physical transmission through the communication channel. In this case, the means 209 for providing the optimization goal is coupled to the second communication layer and is operative for managing the physical layer transmission for the communication channel using, for example, a data link layer and a physical layer. In this case, the optimization goal may be, for example, an optimization of an exploitation of the available bandwidth. By, for example, channel encoding (for example convolutional coding) etc. In this case, the means 207 for providing the optimization goal receives the transmission-oriented optimization goal and provides the same to the selector 201. Accordingly, the optimization goal may be application- and transmission-oriented. In this case, the means 207 for providing the optimization goal is coupled to the first communication layer 103 and to the second communication layer 105 for obtaining an orientation-oriented part of the optimization goal and a transmission-oriented part of the optimization goal.

In order to communicate with the physical layers, the means 207 for providing the optimization goal may comprise a protocol layer interface for interfacing with the first communication layer and with the second communication layer.

As mentioned above, the inventive approach may be applied to optimizing the operation of the protocol stack in a multi-user scenario, where a plurality of users shares the same communication resources. To be more specific, the information to be transmitted may comprise a first information associated with a first user and a second information associated with a second user in the multi-user scenario. As mentioned above, the optimization goal is in this case an optimized transmission quality for a particular user, e.g. for the first information and for the second information. For example, the optimization goal is to transmit the first information with a first information rate associated with a first distortion and to transmit the second information having a second information rate associated with a second distortion through the communication channel and to determine a first channel data rate associated with the first user stream and with a first bit error probability, so that the first information rate associated with the first distortion is supported. Accordingly, the goal is to transmit the second user stream via the communication channel with a second channel data rate without exceeding the bit error probability, so that the second information rate associated with the second distortion is supported. Generally, the first communication layer may be operative for encoding the first information to obtain a first information signal associated with the first user and a second information signal associated with the second user, wherein the first information signal may have the first information rate and the second information signal may have the second information rate. In order to transmit the information through the communication channel, the second communication layer may be operative for encoding the first information signal and the second information signal to obtain a composite signal to be transmitted through the communication channel.

In this case, the inventive selector is operative for jointly selecting the first set of parameters to be used by the first communication layer for encoding the first information and the second information to obtain the first information signal and the second information signal, and to select the second set of parameters to be used by the second communication layer for encoding the first information signal and the second information signal to provide the composite signal to be transmitted through the communication channel, wherein the first communication layer and the second communication layer use the jointly selected first set of parameters and the second set of parameters to optimize the transmission quality of the first information and the transmission quality of the second information.

For example, the second communication layer is operative for scheduling the first information signal and the second information signal, so that the first information signal is transmitted within a first time frame and the second information signal is transmitted within a second time frame. The scheduling has an impact of a resulting channel data rate of the corresponding scheduled information signal, or, generally, information stream. The first selector is then operative for selecting the first set of parameters to obtain the first information signal having the first information rate associated with the first distortion and to obtain the second information signal having the second information rate associated with the second distortion and for selecting the second set of parameters to obtain the composite signal having a data rate supporting the first information rate and the second information rate. The information rate may be for example a number of information packets per time unit, for example a number of information bits per second representing the respective information.

Moreover, the inventive approach may be also applied for information scheduling, for example media data scheduling described above.

Since the selector is operative for controlling the whole operation of the protocol stack by selecting appropriate sets of parameters, the inventive approach may be also applied to both: information data or media data scheduling and user scheduling. For example, the first information associated with the first user comprises a first sub-information and a second sub-information, for example an audio- and a video signal. The inventive selector is then operative for selecting the first set of parameters to be used by the first communication layer for selectively encoding the first sub-information and the second sub-information to obtain the first information signal comprising the encoded first and second sub-information, having, for example, different information rates associated with different distortion profiles. Furthermore, the selector may be operative for selecting the first set of parameters for scheduling the first sub-information within the first information signal and for scheduling the second sub-information within the first information signal, so that the first sub-information and the second sub-information are placed at different positions of the first information signal. In other words, a decision is made which data segment has to be transmitted within one session.

In accordance with the present invention, the inventive apparatus for controlling the operation of a plurality of communication layers may further comprise means for determining the first communication layer and the second communication layer from the plurality of communication layers to achieve the optimization goal. The means for determining the first communication layer and the second communication layer is operative for making a decision which communication layers of the plurality of communication layers have to be optimized in order to achieve the optimization goal. The means for determining determines the first communication layer of which the first set of parameters is to be selected and the second communication layer of which the second set of parameters is to be selected for achieving the optimization goal.

According to a further embodiment of the present invention, the inventive apparatus for controlling the operation of a plurality of communication layers may be operative for user scheduling and scheduling of information associated with each user, as described above. For example, the optimization goal comprises an optimization of the transmission quality in the multi-user scenario. The information may comprise a first information associated with a first user and a second information associated with the first user, a third information associated with a second user and a fourth information associated with the second user. Generally, the inventive approach can be used in the case of a plurality of informations and/or in the case of a plurality of users. The first communication layer is operative for scheduling the first information and the second information to obtain a first information signal comprising the scheduled first and second information associated with the first user. Accordingly, the first communication layer is operative for scheduling the third information and the fourth information to obtain a second information signal associated with the second user. Accordingly, the second communication layer is operative for scheduling the first information signal and the second information signal to obtain a scheduled multi-user stream. In order to achieve the optimization goal mentioned-above, the inventive selector is operative for jointly selecting the first set of parameters to be used by the first communication layer to provide the first information signal and the second information signal, and the second set of parameters to be used by the second communication layer to provide the scheduled multi-user stream to be transmitted via the communication channel.

Figure 3:
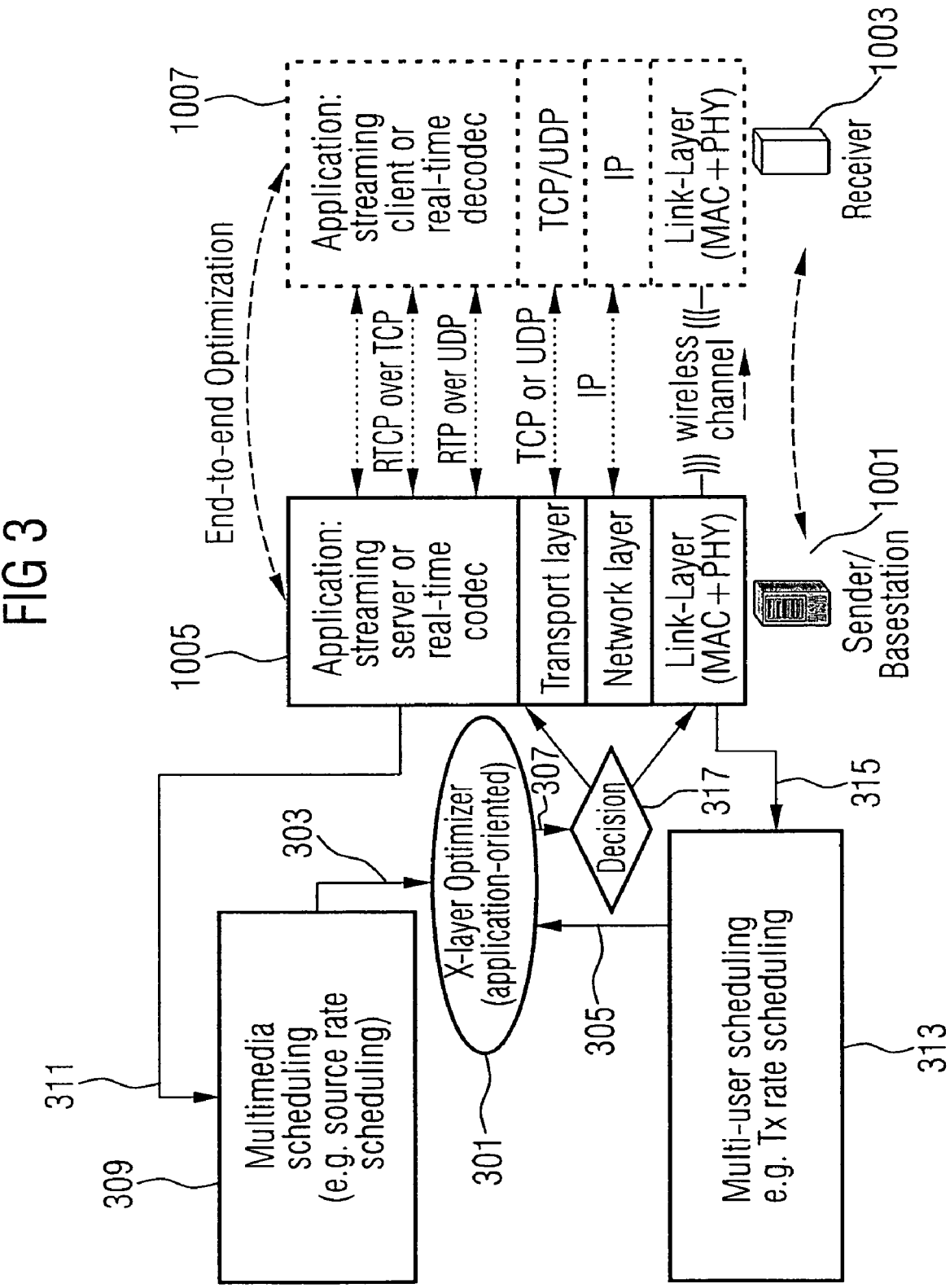
FIG. 3 shows a block diagram of an inventive apparatus for controlling an operation of a plurality of communication layers in accordance with a further embodiment of the present invention.

FIG. 3 shows an apparatus for controlling an operation of a plurality of communication layers in the case of multi-user and multi-media scheduling.

The apparatus shown in FIG. 3 comprises a cross-layer optimizer 301, which is an application oriented optimizer. The cross-layer optimizer has a first input 303, a second input 305 and an output 307. Additionally, the apparatus shown in FIG. 3 comprises a first interface 309 having an input 311 and an output coupled to the input 303 of the cross-layer optimizer (X-layer optimizer). Additionally, the apparatus comprises a second interface 313 having an input 315 and an output coupled to the second input 305 of the cross-layer optimizer. The first interface 309 is coupled via the input 311 to the application layer of the protocol stack 1005 previously discussed. Accordingly, the second interface 313 is coupled via the input 315 to the link layer of the protocol stack 1005.

The apparatus shown in FIG. 3 further comprises a decision element 317 having an input, a first output and a second output. The output 307 of the cross-layer optimizer 301 is coupled to the input of the decision element 317. The first output of the decision element 317 is coupled to the application layer of the protocol stack 1005, and the second output of the decision element 317 is coupled to the link layer of the protocol stack 1005.

In accordance with the present invention, a cross-layer optimization approach for wireless media transmission is provided. In particular, a joint optimization of media data scheduling and multi-user scheduling can be achieved, since the application layer and the link layer are jointly optimized. The motivation for the inventive cross-layer design are the mobile communication challenges like for example a dynamic behavior of the communication system being characterized by a (non-predictable) variation of quality and diversity of connectivity. Additionally, certain dynamic requirements with respect to transmitted services and applications have to be made with respect to significant differences in requirements (e.g. quality of service), changing requirements as of user preferences, and short technology evolution cycles requiring system's flexibility.

Contrary to the traditional layered systems, where a protocol intercommunication is strictly defined which results in an inefficient use of resources, since each protocol is optimized for worse condition independently, the inventive approach as demonstrated in FIG. 3 provides a possibility of a global optimization of a behavior of the protocol stack by jointly optimizing a plurality of protocol layers.

As shown in FIG. 3, an information about a multi-media scheduling (e.g. source rate scheduling) is provided via the first interface 309 to the cross-layer optimizer 301. Accordingly, the second interface 303 provides a multi-user scheduling information, e.g. transmit rate scheduling to the cross-layer optimizer 301, so that a (new) first set of parameters can be provided to the application layer and a (new) second set of parameters can be provided to the link layer, so that an optimum multi-media scheduling and multi-user scheduling can be provided, so that the communication resources are effectively exploited.

The cross-layer optimizer 301 corresponds to the inventive selector being operative for selecting the first and second set of parameters. The decision element 307 decides, which set of parameters is to be provided to which protocol layer.

In the following and by the way of example only, as an implementation embodiment, a video streaming server residing in the base station and mobile devices hosting streaming clients will be considered, respectively. The optimization goal is to maximize the end-to-end quality perceived by the users, while efficiently using the wires resources. Video data scheduling is the process of deciding which data segment in one streaming session has to be transmitted at what time, while multi-user scheduling, which belongs to data link layer scheduling, determines for instance which user is allowed to use the channel at a given time, frequency or code.

In the following, the main features of streaming video that are relevant in the considered scenario will be discussed. The video is pre-encoded at multiple bit rates using a standard video compression scheme and the corresponding video streams are stored on the streaming server. When the video stream is requested by the client, the video stream is packetized and sent to the receiver. The receiver pre-buffers some data before playout begins which allows a smoothing of some of the transmission quality variations. The end-to-end latency of the application is directly related to the amount of data that is stored prior to playout. The number of bits to be sent for each video frame depend on what kind of encoding mode is selected.

Figure 4:
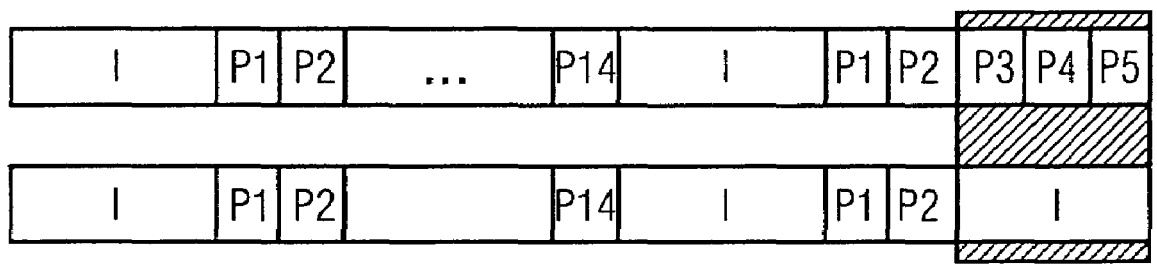
FIG. 4 demonstrates control frame scheduling.

In reference to FIG. 4, so-called I-frames being encoded without reference to previous frames and P-frames that are encoded by forming a prediction from previous frames can be distinguished. While I-frames can be decoded without receiving the previous frame, the P-frames typically cannot be decoded without this side-information. As a result, the I-frames are bigger than P-frames, as depicted in FIG. 4.

In order to allow fast forward and interactive scene selection, I-frames are typically introduced about every 500 to 1000 ms. An I-frame and all the following P-frames up to the end excluding the next I-frame will be referred to in the following as a group of pictures (GOP). In order to provide the I-frames and the P-frames, a control frame scheduling is performed to determine a frame priority. The source parameters may be a source rate, a number of frames per second, a delay constraint, and a distortion profile of a group of pictures.

In the following it is assumed, that the reconstruction quality at the receiver depends on the number of successfully decoded frames within a group of pictures. Since a successful decoding of P-frames depends on an error-free reception of all previous frames of the same group of pictures, loosing the first frame of a group of pictures leads to the worst result. In this case, the most recent decoded frame is displayed as a still image until the next I-frame is successfully received. Loosing the last frame of a GOP leads to little distortion as just the second last frame of the GOP is displayed twice.

Figure 5A:
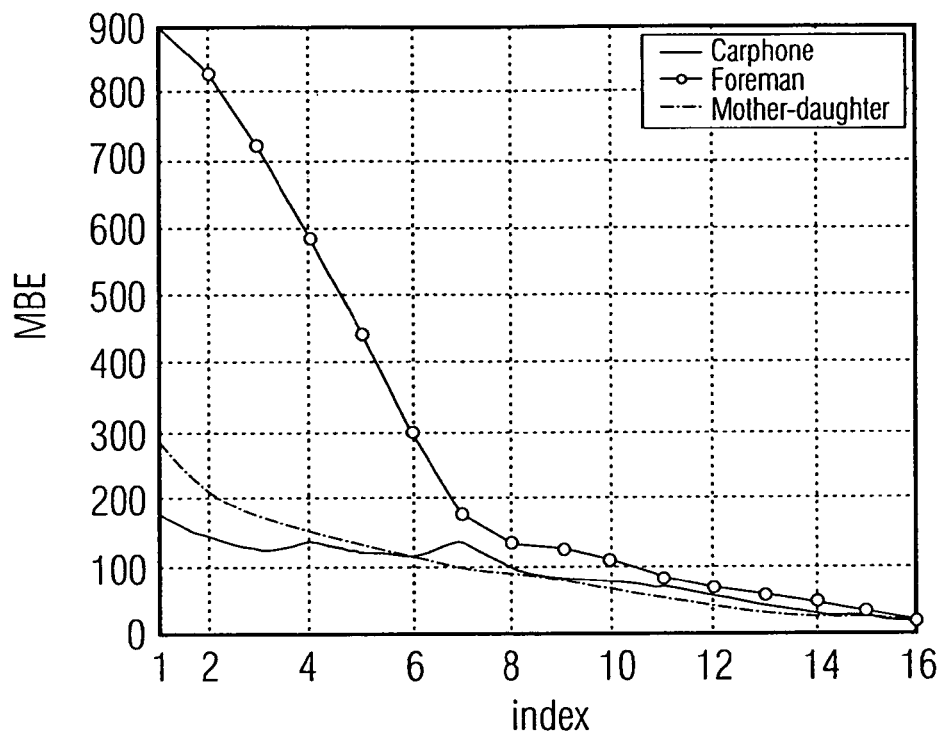
FIG. 5a demonstrates an importance of transmitted frames.

FIG. 5a shows a simulation result in terms of the mean squared error (MSE), which is the mean squared reconstruction error in this case for a group of pictures consisting of 15 frames when loosing different frames for three different videos. Additionally, three different scenarios, namely Carphone, Foreman and Mother-Daughter scenario are considered. As can be seen from FIG. 5a, the MSE is at the largest, when loosing the first frame of a GOP. The distortion decreases as is proceeded within the GOP and becomes just the encoding distortion, which is a function of the bit rate of the video stream, when all frames are timely and error-free received, which is referred to as index 16 in FIG. 5a. The actual error depends on the scene content. If there is little motion in the sequence, the loss of a frame has little effect on the quality of the constructed sequence. If there is a significant motion, however, the influence of a lost frame can be significant.

In video data scheduling, the application has to decide when to send a frame, which is described in P. A. Chou, and Z. Miao "Rate-Distortion Optimization Streaming of Packetized Media", Technical Report MSR-TR-2001-35, Microsoft Research, Microsoft Corporation, February 2001. As the first frame of GOP is the most important one, the application will increase the probability of error-free reception by assigning the most priority to this frame during scheduling. This means for instance, that the I-frame is transmitted twice while all other frames of the GOP are transmitted only once. Depending on the available transmission rate, the application therefore can choose between different frame scheduling patterns by selecting different sets of parameters.

In wireless networks, each base station serves multiple users (clients) or mobile stations by means of time-division, frequency-division or code-division. Multi-user scheduling, which is a part of data link layer scheduling, determines which user is allowed to use the channel at a predetermined time, frequency or code. By scheduling the multi-user transmission based on user demand and channel stage, the efficiency of utilizing the resource can be improved significantly. In particular, each user might obtain different transmission data rates, when different scheduling or arrangements of the transmission is performed.

Figure 5B:
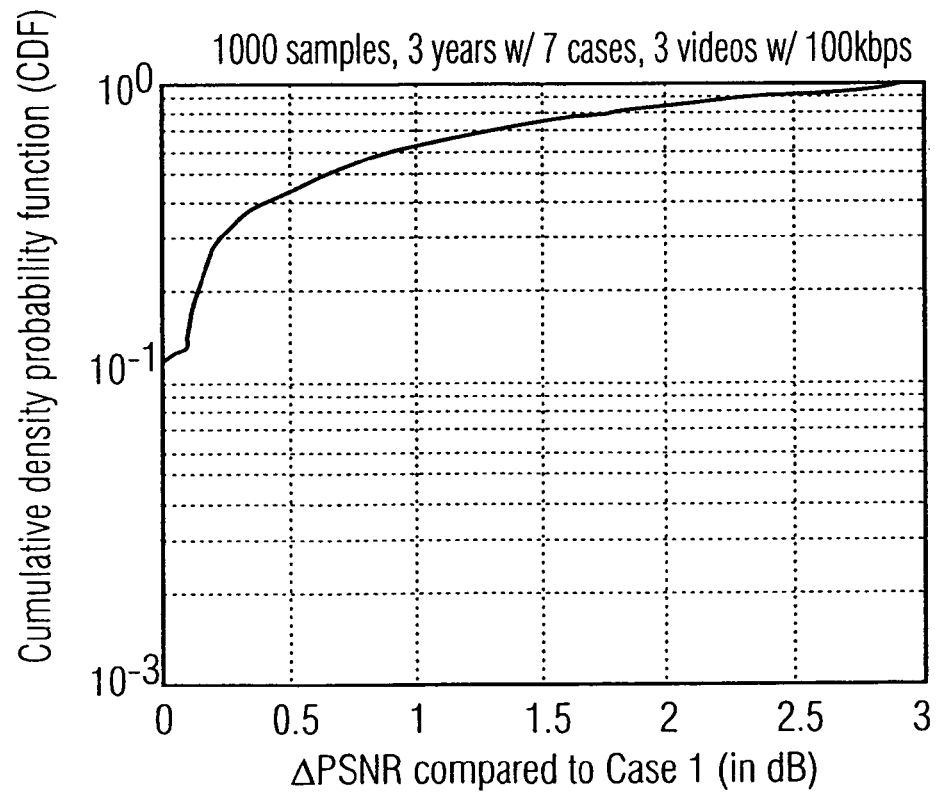
FIG. 5b demonstrates a performance of the inventive apparatus for controlling an operation of a plurality of communication layers.

FIG. 5b shows selected experimental results demonstrating the performance of the inventive cross-layer information exchange. In the experiments shown in FIG. 5b, three users with three different videos are optimized for a case of seven different scheduling scenarios shown in FIG. 6. In particular, FIG. 6 shows an example with three users, which are arranged with seven different cases of transmission time. One of these cases is chosen for providing the experimental results for the data link layer by maximizing the end-to-end quality perceived by the users, which is a part of the task of the inventive cross-layer optimizer. Each case applies an optimized frame scheduling pattern for the resulting transmission data rate.

Referring again to FIG. 5b, one case out of the seven cases is chosen for maximizing the minimum performance among the three users. In particular, FIG. 5b shows a peak signal to noise ratio (PSNR) improvement of the worst user in the selected case compared to that in case 1 of FIG. 6, which can be considered as performance without cross-layer optimizer. As can be seen, a probability of an improvement larger than 1 dB is more than 40%.

Figure 7:
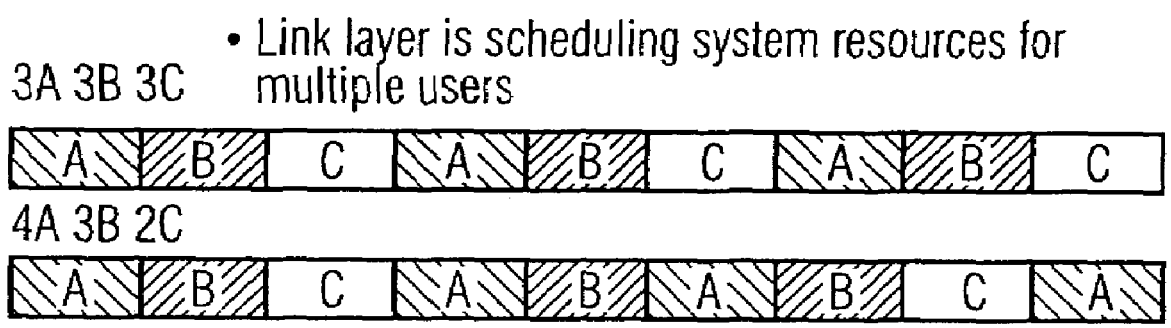
FIG. 7 demonstrates the inventive scheduling approach for multiple users in accordance with the present invention.

In accordance with the present invention, the transmission parameters may be a data rate and an error rate for the link layer, a distance in terms of the signal to noise ratio (SNR), a speed in terms of channel coherency time and a modulation scheme in the physical layer. The link layer is operative for scheduling the system resources for multiple users as depicted in FIG. 7.

FIG. 8 shows a further experimental result with respect to a maximization of transmission quality of the worst performing user.

In FIG. 8 a cumulative density probability function (CDPF) versus ΔPSNR compared to the case number 1 is shown, demonstrating the performance of the inventive approach. The upper-right diagram shown in FIG. 8 demonstrates the system performance in terms of a frequency of the transmission of a selected case 1-7.

In accordance with a further aspect of the present invention, a communication apparatus for processing an information to be transmitted in accordance with a transmission protocol is provided. The transmission protocol may comprise a plurality of protocol layers as described above. The inventive communication apparatus comprises an information source for providing the information and the apparatus for controlling the plurality of protocol layers in accordance with the previous descriptions. In order to process the information in accordance with the transmission protocol, the inventive communication apparatus further comprises a processor for processing the information in accordance with the protocol layers. The processor may be, for example, a network processor.

Accordingly, the present invention further provides a communication apparatus for processing a received signal in accordance with a reception protocol, wherein the reception protocol is a protocol implemented in the receiver. The received signal is a received version of the transmit signal transmitted through a communication channel, wherein the transmit signal comprises an information processed in accordance with a transmission protocol in a transmitter. The transmission protocol may comprise a first transmit protocol layer (first transmission protocol layer) and a second transmit protocol layer (second transmission protocol) as described above, wherein an operation mode of the first transmission protocol layer is determined by a first set of transmit (transmission) parameters and wherein an operation mode of the second transmission protocol layer is determined by a second set of transmission parameters. As described above, the first set of transmission parameters and the second set of transmission parameters may be pair-wise selected from a plurality of transmission parameters in dependence on a property of the communication channel and, optionally, on an optimization goal, as described above. The receive protocol comprises a first receive (reception) protocol layer and a second receive (reception) protocol layer, wherein an operation mode of the first receive protocol layer is determined by a first set of receive (reception) parameters, and wherein an operation mode of the second receive protocol layer is determined by a second set of receive (reception) parameters. The inventive apparatus comprises a storage element for storing a plurality of sets of receive parameters, each set of receive parameters corresponding to a set of transmit parameters. The storage element corresponds to the inventive storage element described above. Furthermore, the apparatus may comprise means for extracting the first set of receive parameters and the second set of receive parameters from the first receive protocol layer and from the second receive protocol layer in accordance with the functionality described above.

The inventive apparatus may further comprise means for providing a transmit protocol information indicating the pair of the first and the second set of transmit parameters used for processing the information before transmitting the information. In other words, the inventive means for providing the transmit protocol information indicates, which operation mode of which protocol layer is to be considered. Accordingly, the inventive apparatus comprises a selector for selecting a pair consisting of the first set of receive parameters and the second set of receive parameters corresponding to the pair of the first and the second set of transmit parameters on the basis of the transmit protocol information. Additionally, the inventive apparatus comprises means for providing the pair of the first set of receive parameters and the second set of receive parameters to the first receive protocol layer and to the second receive protocol layer. The functionality of the means for providing the pair of the first set of receive parameters and of the second set of receive parameters may be identical to that described above in connection with a means for providing the first and the second set of parameters to the first and second communication layer.

Additionally, the inventive apparatus for processing the received signal comprises a processor for processing the received signal in accordance with the received protocol to obtain the information.

Furthermore, the inventive apparatus may comprise a controller for providing a signaling information to the selector, wherein the signaling information indicates whether the pair consisting of the first and second set of parameters is to be selected. Furthermore, the inventive controller is operative for generating the signaling information from the transmit protocol information and a received protocol information indicating a pair of the first and second set of received parameters currently used by the receive protocol.

To provide the receive protocol information, the inventive apparatus further comprises means for extracting the first set of received parameters from the first received protocol layer and the second set of received parameters from the second received protocol layer in order to monitor a current status of protocol layer.

The provided apparatus and methods may be used to optimize a transmission of media data in wireless communication by inter-layer information exchange. The inventive optimization is enabled by jointed optimization of media data scheduling on the application layer and multi-user scheduling on the link layer. Therefore, an end-to-end quality perceived by the users is improved by efficiently using the wireless resources. Moreover, the inventive approach can be of benefit in service provisioning systems for wireless networks in order to overcome the highly dynamic characteristics of transmission capabilities and application requirements.

It is to be noted that the inventive approach can generally be used in the case of a plurality of users and/or in the case of a plurality of informations associated to each user.

As mentioned above, the sets of parameters may be jointly pre-computed, so that the inventive selector selects actually optimized sets of parameters.

In the following, we describe cross-layer optimization of application layer and radio link layer for wireless multi-user multimedia communication. Our aim is to optimize the end-to-end quality of the wireless media application as well as efficiently utilize the wireless resources. A new architecture for achieving our goal is provided and formulated. This architecture consists of the process of parameter abstraction, a cross-layer optimizer, and the process of decision distribution. In addition, sample numerical results are provided to reveal the potential of the inventive joint optimization. Cross layer design in mobile communication has recently gained much attention in the context of multimedia service provisioning (e.g., voice, video, audio, data). The concept of cross-layer design introduces inter-layer concepts across the protocol stack and allows us to jointly optimize the communication on two or more layers. Although this concept can be employed in all communication networks, it is especially important in wireless networks because of the unique challenge of the wireless environment (i.e., the time-varying and the fading nature of the wireless channels). This wireless nature and user mobility lead to random variation in network performance and connectivity. In addition, the demanding quality of service (QoS) requirements (e.g., data rate, latency, continuity and error rate) for multimedia support makes mobile multimedia communication even more challenging in system design. This challenge will be hard to meet with a conventional layered design approach, which separates system design into essentially independent layers. In order to provide end-to-end QoS, parameter adaptation has to be addressed at all OSI (Open Systems Interconnection) layers. Therefore, the inventive concept of cross-layer design is provided, for which information has to be exchanged between different layers. In the following, we exploit the inter-layer coupling of a cross layer design concept by proposing a joint application and radio link layer optimization for wireless multimedia communication. We refer to the radio link layer as the physical layer and the data link layer in the protocol stack. Our aim is to optimize the end-to-end quality of the wireless multimedia communication application as well as efficiently utilize the wireless resources. To achieve this aim, an architecture for the joint layer optimization is developed to provide a potential solution for the implementation of the cross layer optimization concept. This architecture consists of the process of parameter abstraction, across-layer optimizer, and the process of decision distribution. Every part in this architecture is formalized. In addition, sample numerical results are provided to reveal the potential of the inventive joint optimization. Previous work mainly concentrates on optimizing the performance at a single layer, such as the adaptation of the application to the transport, network, data-link and physical layer characteristics (bottom-up approach) and the adaptation of the physical, data link or network layers to the application requirements (top-down approach). Most of the on-going research in cross layer design focuses on joint optimization of the physical layer and data link (or MAC) layer. Some include the optimization of routing at the network layer in the cross layer optimization for ad hoc wireless networks and others include the source rate in the joint optimization of transmit power and forward error correction coding at the physical layer.

The present approach is different from previous approaches in that our goal is preferably to optimize the end-to-end quality of multimedia applications. For this we consider the joint optimization of three layers in the protocol stack, namely the application layer (layer 7), the data link layer (layer 2), and the physical layer (layer 1). We include the application layer in the joint optimization because the end-to-end quality observed by the users directly depends on the application and the application layer has direct information about the impact of each successfully decoded piece of media data on the perceived quality. We also include the physical layer and the data link layer in our consideration because the unique challenge of mobile wireless communication results from the nature of the wireless channel, which these two layers have to cope with. A new architecture for achieving our goal is provided and formulated. The structure of this paper is as follows.

Figure 12:
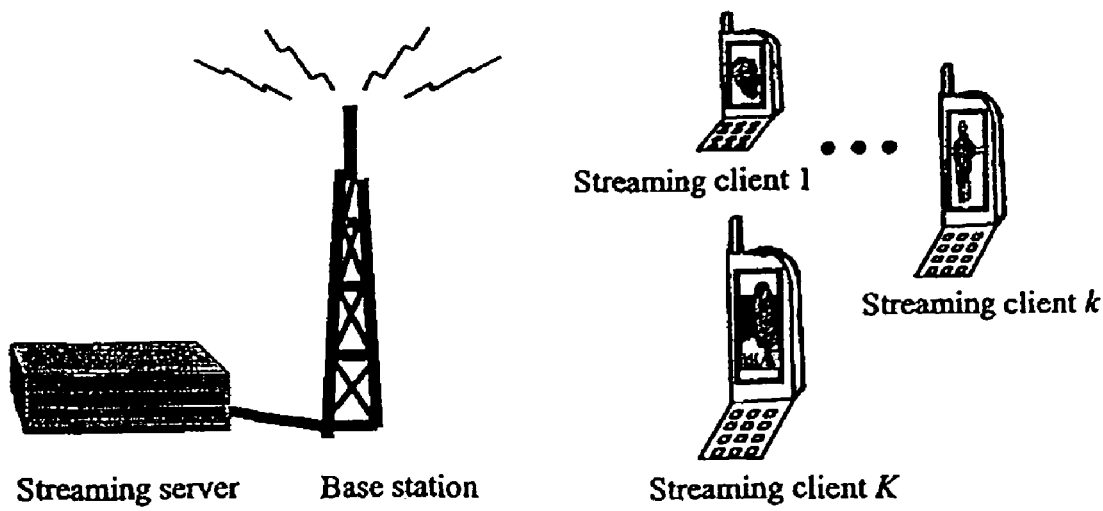
FIG. 12 shows a block diagram of a considered communication system.
Figure 13:
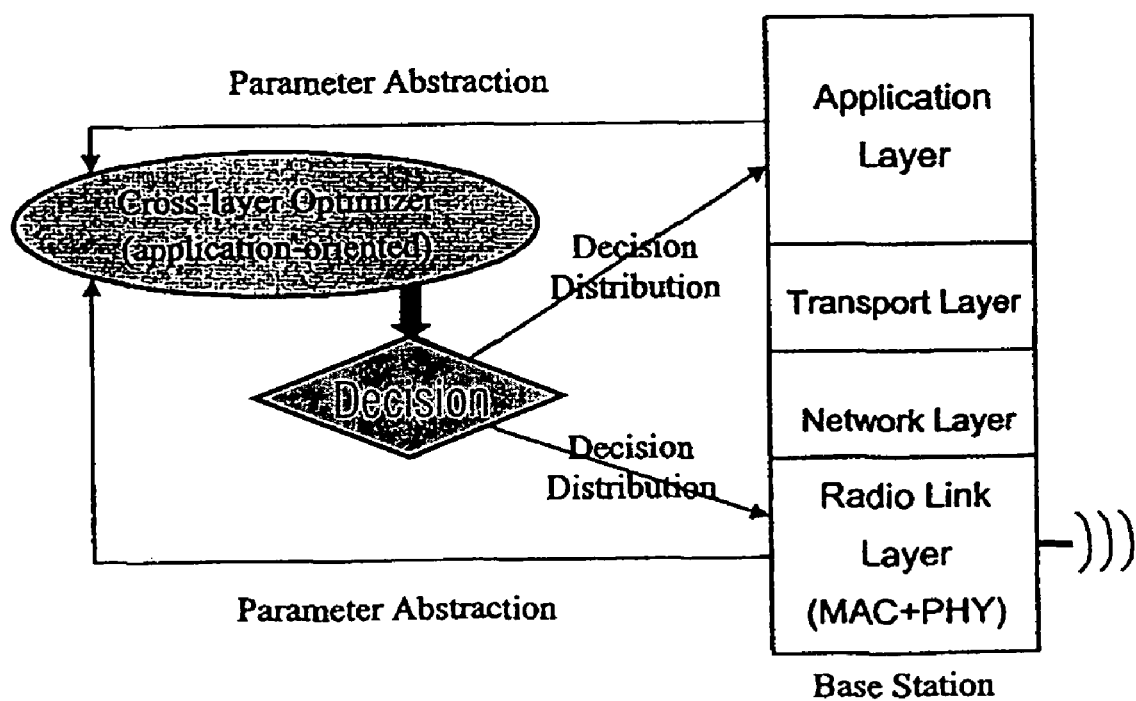
FIG. 13 shows an inventive system architecture for joint layer optimization.

We assume streaming video as an example application for the multimedia service and consider a video-streaming server located at the base station and multiple streaming clients located in mobile devices. As shown in FIG. 12, K streaming clients or users are assumed sharing the same air interface and network resources but requesting different video contents. Note that only the protocol stack necessary for the wireless connection has to be considered since in our scenario the video streaming server is located directly at the base station. Therefore, the transport layer and the network layer in the protocol stack can be excluded from our optimization problem. We focus on the interaction between the application layer and the radio link layer, which incorporates both the physical (PHY) layer and the data link layer. At the base station, an architecture as shown in FIG. 13 is suitable to provide end-to-end quality of service optimization. This Fig. illustrates the tasks and information flows related to the joint optimization. Necessary state information is first collected from the application layer and the radio link layer through the process of parameter abstraction for the cross-layer optimizer. The process of parameter abstraction results in the transformation of layer specific parameters into parameters that are comprehensible for the cross-layer optimizer, so called cross-layer parameters. Then, the optimization is carried out by the cross-layer optimizer with respect to a particular objective function. From a given set of possible cross-layer parameter tuples, the tuple optimizing the objective function is selected. After the decision on a particular cross-layer parameter tuple is made, the optimizer distributes the decision information back to the corresponding layers. Note that the set of possible cross-layer parameter tuples in general can be infinite. It is necessary to pre-select only a finite set of appropriate tuples in order to obtain the decision quickly. In this way, the final decision on the optimal cross-layer parameter tuple might result only in a local optimum.

In order to carry out the joint optimization, state information or a set of key parameters have to be abstracted from the selected layers and provided to the cross-layer optimizer. This is necessary because layer specific parameters may be incomprehensible or of limited use to other layers and the optimizer.

In wireless networks, the physical layer and the data link layer are dedicatedly designed for the dynamic variation of the wireless channel during the provision of a particular service. This is in contrast to wireline networks which experience much less dynamic variation. The physical layer deals with the issues including transmit power (through transmit power control), channel estimation, synchronization, signal shaping, modulation and signal detection (through signal processing), while the data link layer is responsible for radio resource allocation (multi-user scheduling or queuing) and error control (by channel coding, usually a combination of forward error correction coding (FEC) and automatic retransmission (ARQ)). Since both of these two layers are closely related to the unique characteristics of the wireless nature, it is useful to consider them together. In the following, we refer to their combination as the radio link layer. Since there are many issues in the radio link layer and these issues are related to each other, parameter abstraction is necessary. To be more specific, we define the set $R=\{r_1, r_2, \ldots\}$ tuples $r_i=(r_i^1, r_i^2, \ldots)$ of radio link layer specific parameters $r_i^j$ (e.g., modulation alphabets, code rate, air time, transmit power, coherence time). Since these radio link specific parameters may be variable, the set R contains all possible combinations of their values and each tuple $r_i$ represents one possible combination.

In order to formalize the process of parameter abstraction, we define the set $\tilde{R}=\{\tilde{r}_1, \tilde{r}_2, \ldots\}$ of tuples $\tilde{r}_i=(\tilde{r}_i^1, \tilde{r}_i^2, \ldots)$ of abstracted parameters $\tilde{r}_i^j$. The relationship between the set R and the set $\tilde{R}$ is established by the relation $$G \subseteq R \times \tilde{R}$$

with domain R and co-domain $\tilde{R}$, which realizes a mapping between R and $\tilde{R}$. Here, the symbol × refers to the Cartesian product. G is the subset that defines the mapping between R and $\tilde{R}$. We call this mapping process radio link layer parameter abstraction. For a single user scenario, for example, four key parameters can be abstracted. They are transmission data rate d, transmission packet error rate e, data packet size s, and the channel coherence time t. This leads to the abstracted parameter tuple $\tilde{r}_i=(d_i, e_i, s_i, t_i)$. In a K user scenario, one can extend the parameter abstraction for each user. The parameter tuple $\tilde{r}_i$ then contains 4K parameters, $\tilde{r}_i=(d_i^{(1)}, e_i^{(1)}, s_i^{(1)}, t_i^{(1)}, \ldots, d_i^{(K)}, e_i^{(K)}, s_i^{(K)}, t_i^{(K)})$, in which a group of four parameters belongs to one user.

The transmission data rate d is influenced by the modulation scheme, the channel coding, and the multi-user scheduling. The transmission packet error rate e is influenced by the transmit power, channel estimation, signal detection, the modulation scheme, the channel coding, the current user position, etc. The channel coherence time t of a user is related to the user velocity and its surrounding environment, while the data packet size s is normally defined by the wireless system standard. These inter-relationships define the relation G. Alternatively, it is possible to transform the transmission packet error rate e and the channel coherence time t into the two parameters of the two-state Gilbert-Elliott model, which are the transition probabilities (p and q) from one state to another. The transformation is given by $$p = \frac{es}{td} \text{ and } q = \frac{(1-e)s}{td}$$

where p is the transition probability from the good state to the bad state and q is the transition probability from the bad state to the good state.

In this way, the abstracted parameter tuple becomes $\tilde{r}_i=(d_i^{(1)}, p_i^{(1)}, s_i^{(1)}, q_i^{(1)}, \ldots, d_i^{(K)}, p_i^{(K)}, s_i^{(K)}, q_i^{(K)})$. One advantage of this transformation is that the resulting parameter tuple $\tilde{r}_i$ is more comprehensible for high layers in the protocol stack.

Figure 14:
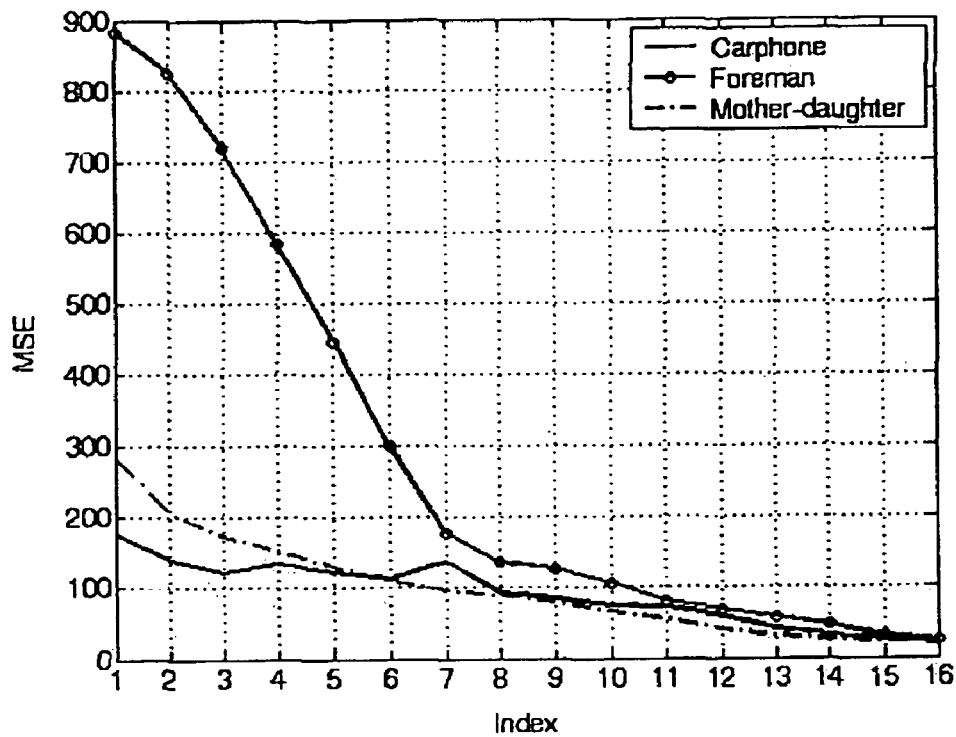
FIG. 14 shows a MSE for a group of pictures in 3 measured videos.

The application layer is the layer where the media data is compressed, packetized, and scheduled for transmission. The key parameters to be abstracted for the cross-layer optimization are related to the characteristics of the compressed source data. This implies that these key parameters may depend on the type of application or service because the characteristics of the compressed source data may depend on the application or service. For a formal description, let us define the set $A=\{a_1, a_2, \ldots\}$ of tuples $\tilde{a}_i=(\tilde{a}_i^1, \tilde{a}_i^2, \ldots)$ of application layer specific parameters $\tilde{a}_i^j$. Since these application layer specific parameters may be variable, the set A contains all possible combinations of their values and each tuple represents one possible combination. We further define the set $\tilde{A}=\{\tilde{a}_1, \tilde{a}_2, \ldots\}$ of tuples $\tilde{a}_i=(\tilde{a}_i^1, \tilde{a}_i^2, \ldots)$ of abstracted parameters $\tilde{a}_i^j$. The relationship between the set A and the set $\tilde{A}$ is established by the relation $$H \subseteq A \times \tilde{A}$$

with domain A and co-domain $\tilde{A}$, which realizes a mapping between A and $\tilde{A}$. We call this mapping process application layer parameter abstraction. In the following, we assume a streaming video service. The abstracted parameters of this service include the source data rate, the number of frames (or pictures) per second, size (in terms of bytes) and maximum delay of each frame (or picture). Other important information for the optimizer is the distortion-rate function (encoding distortion) and the distortion profile of a particular lost frame (or picture) (see FIG. 14). FIG. 14 shows an example of the distortion profile of lost frames and the encoding distortion for 3 different videos, each of which is composed of group of pictures(GOP) with 15 frames, which corresponds to 0.5 seconds at a frame rate of 30 frames per second. The video sequence are encoded at a mean data rate of 100 kbps. Each GOP starts with an independently decodable intra-frame. The following 14 frames are inter-frames, which can only be successfully decoded if all previous frames of the same GOP are decoded error-free. The distortion is quantified by the mean squared reconstruction error (MSE), which is measured between the displayed and the original video sequence. The index in FIG. 14 indicates the loss of a particular frame. It is assumed that as part of the error concealment strategy all following frames of the group of picture are not decodable and the most recent correctly decoded frame is displayed instead of the non-decoded frames. Also, note that the index 16 gives the MSE when all frames are received correctly, which we refer to as the encoding distortion because of the quantization error.

The abstracted parameter sets $\tilde{R}$ and $\tilde{A}$) from both the application layer and the radio link layer form the input to the cross-layer optimizer. Since any combination of the abstracted parameter tuples from the two input sets is valid, it is convenient to define the cross-layer parameter set $$\tilde{X} = \tilde{R} \times \tilde{A}$$

which combines the two input sets into one input set for the optimizer. The set $\tilde{X}=\{\tilde{x}_1, \tilde{x}_2, \ldots\}$ consists of tuples $\tilde{x}_n=(\tilde{r}_i, \tilde{a}_j)$ and $|\tilde{X}|=|\tilde{R}| \cdot |\tilde{A}|$.

With the formalism introduced above, the operation of the cross-layer optimizer $\Omega$ can now be described by $$\Omega: \tilde{X} \to \hat{X} \subset \tilde{X}$$

The optimizer selects from the input set $\tilde{X}$ a true non-empty subset $\hat{X}$ that is the output of the optimizer.

In the following, we assume $|\hat{X}|=1$, that is the output of the optimizer is a single tuple and $\hat{X}=\tilde{x}_{opt} \in \tilde{X}$. The decision or output of the cross-layer optimizer $\tilde{x}_{opt}$ is made with respect to a particular objective function $$\Gamma: \tilde{X} \to R$$

where R is the set of real numbers. Therefore, the output of the optimizer can be expressed as $$\tilde{x}_{opt} = \arg\min_{\tilde{x} \in \tilde{X}} \Gamma(\tilde{x})$$

The choice of a particular objective function Γ depends on the goal of the system design and the output (or decision) of the optimizer might be different for different objective functions. In the example application of streaming video, one possible objective function in a single user scenario is the MSE between the displayed and the original video sequence. For a multi-user situation, different extensions of the MSE are possible. For example, the objective function can be the sum of MSE of all the users. That is, $$\Gamma(\tilde{x}) = \sum_{k=1}^{K} MSE_k(\tilde{x})$$

where $MSE_k(\tilde{x})$ is the MSE of user k for the cross-layer parameter tuple $\tilde{x} \in \tilde{X}$. This objective function will optimize the average performance among all users. Other common definitions of the objective function include which optimizes the performance of the worst performing user, and $$\Gamma(\tilde{x}) = \max_{k=1,\ldots,K} MSE_k(\tilde{x})$$

which is equivalent to maximizing the sum of the peak-signal-to-noise ratio of all users.

Once the output (or decision) of the cross-layer optimizer $\tilde{x}_{opt} = (\tilde{r}_{opt}, \tilde{a}_{opt})$ is obtained, the decisions $\tilde{r}_{opt}$ and opt $\tilde{a}_{opt}$ have to be communicated back to the radio link layer and the application layer, respectively. During this, the process of parameter abstraction has to be reversed and the abstracted parameters $\tilde{r}_{opt}$ and $\tilde{a}_{opt}$ are transformed back to the layer specific parameters $r_{opt} \in R$ $a_{opt} \in A$. This reverse transformation is given by $$r_{opt} \in \{r | (r, \tilde{r}_{opt}) \in G\}$$

and $$a_{opt} \in \{a | (a, \tilde{a}_{opt}) \in H\}$$

In case the set $\{r | (r, \tilde{r}_{opt}) \in G\}$ or the set $\{a | (a, \tilde{a}_{opt}) \in H\}$ has more than one element, the choice of a particular element can be made at the corresponding layers individually.

In the following, we provide sample simulation results to evaluate the performance of the inventive joint optimization. Throughout this section, we assume 3 users (user 1, 2, and 3), each of which requests a different video. User 1, 2, and 3 request the Carphone (CP), Foreman (FM), and Mother-daughter (MD) video, respectively. We choose the peak-signal-to-noise ratio (PSNR) as our performance measure. PSNR is defined as PSNR=10 $\log_{10}(255^2/MSE)$. The larger the PSNR is, the smaller the MSE, which is computed between the original video sequence and the reconstructed sequence at the client or user. Therefore, the larger the PSNR is, the better the performance. As an example, we use the objective function given above which maximizes the worst-case user's performance.

Figure 15:
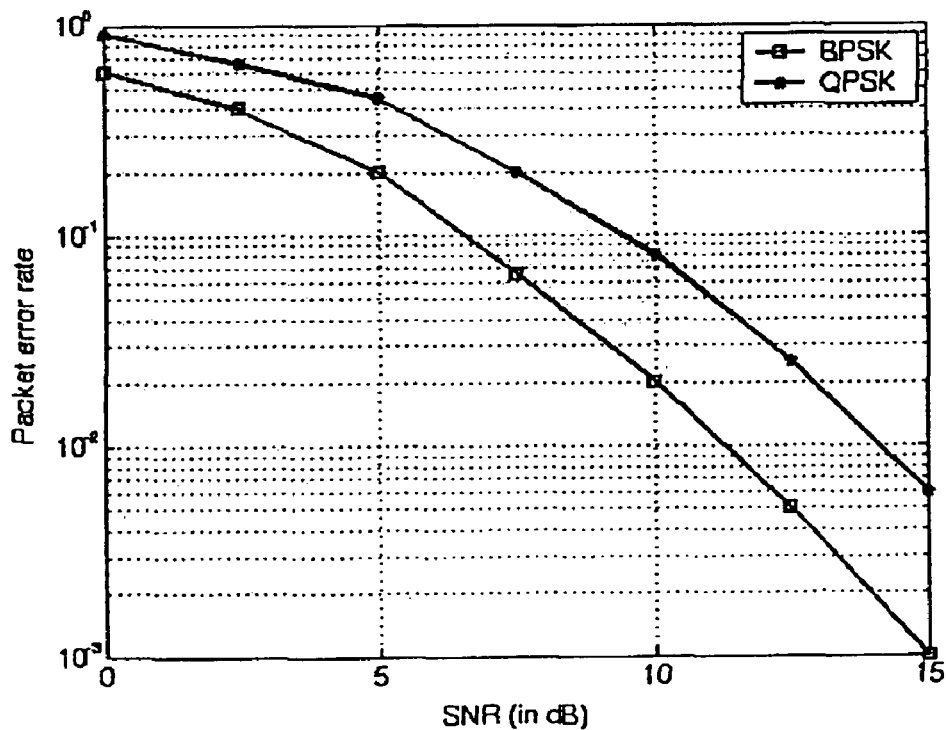
FIG. 15 shows a frame error rate with respect to signal-to-noise ratio.
Figure 16:
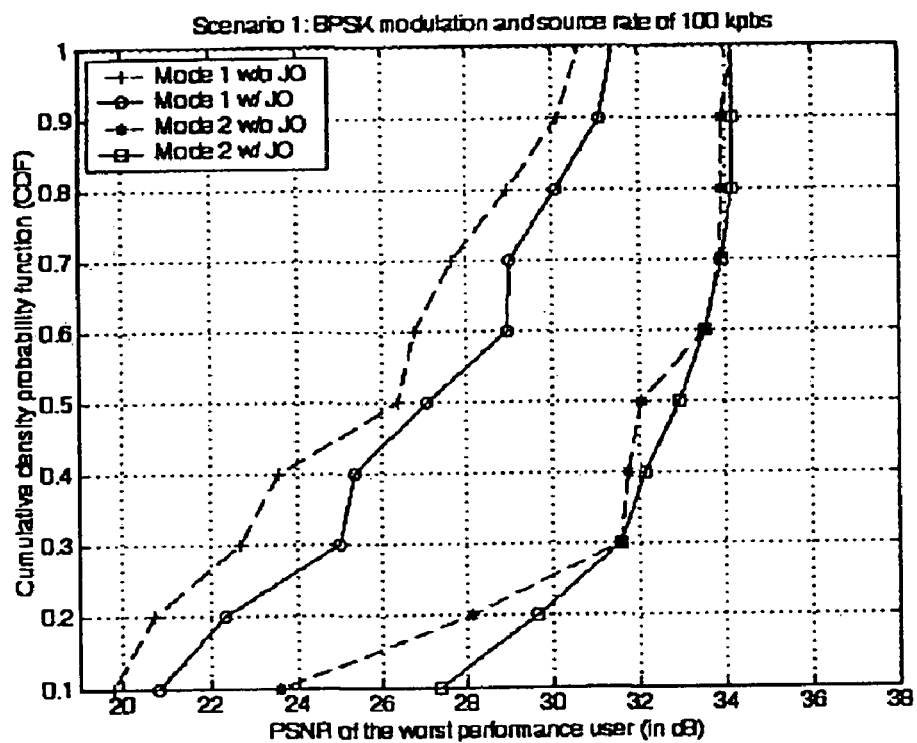
FIG. 16 shows a performance comparison for scenario 1.

Therefore, the cross-layer optimizer chooses the parameter tuple that minimizes the maximum of MSE (or equivalently maximizes the minimum of the PSNR) among the users. In the simulation, it is assumed that the data packet size at the radio link layer is equal to 54 bytes, which is the same as the specified packet size of the IEEE802.11a or HiperLAN2 standard. The channel coherence time is assumed to be 50 ms for all the three users, which approximately corresponds to a pedestrian speed (for 5 GHz carrier frequency). Since the transmission data rate is influenced by the modulation scheme, the channel coding, and the multi-user scheduling, two different modulations (BPSK and QPSK) are assumed and it is further assumed that there are 7 cases of time arrangement in a time-division multiplexing based multi-user scheduling as shown in FIG. 11a. A user's transmission data rate is assumed to be equal to 100 kbps when BPSK is used and ⅔ of the total transmission time is assigned to it. Therefore, if QPSK is used and ⅘ of the total transmission time is assigned, the user can have a transmission data rate as high as 400 kbps. The transmission error rate on the other hand depends on the transmission data rate, the average SNR and the error correcting capability of the channel code. Usually, the performance of a channel code is evaluated in terms of the residual error rate (after channel decoding) for a given receive SNR. In our simulation, we assume a convolutional code of code rate ½ and a data packet size of 54 bytes. The residual packet error rate is shown in FIG. 15 as a function of SNR. However, in the wireless link, the receive SNR is not constant, but fluctuating around the mean value (long term SNR), which is due to fast fading caused by user mobility. In this way, the receive SNR can be modeled as a random variable with a certain probability distribution, which is determined by the propagation property of the physical channel (e.g., Rayleigh distribution, Rice distribution). The residual packet error rate in a fading wireless link is computed by averaging this packet error ratio (e.g., from FIG. 15) with the fading statistics. Assuming Rayleigh fading, the resulting average packet error rate is given in FIG. 16 as a function of the average signal-to-noise ratio (SNR). This resulting average packet error rate is used as the parameter e in our simulation. User position dependent path loss and shadowing commonly observed in wireless links are taken into account by choosing the long-term average signal-to-noise ratio randomly and independently for each user uniformly within the range from 1 to 100 (0 dB to 20 dB). On the application layer, it is assumed that the video is encoded using the emerging H.264 video compression standard with 15 frames per GOP (per 0.5 second). Two different values of the source rate (100 kbps and 200 kbps) are considered. This means that the video has been pre-encoded at two different target rates and both versions are stored on the streaming server. We can switch from one source stream to the other at the beginning of a GOP. In each GOP, the first frame is an I-frame and the following 14 frames are P-frames. We use the measured distortion profile of a particular lost frame and the encoding distortion for the 3 requested videos. FIG. 14 shows an example of a distortion profile in terms of MSE for a GOP at a source rate of 100 kbps. The MSE is measured between the displayed and the original video sequence and averaged across a GOP. In FIG. 14, the index indicates the loss of a particular frame. It is assumed that all following frames of the GOP become not decodable and the most recent correctly decoded frame is displayed instead of the non-decoded frames. Note that the index 16 gives the MSE when all frames are received correctly, which is the encoding distortion. Also, note that since successful decoding of P-frames depends on error-free reception of all previous frames of the same GOP, losing the first frame of a GOP leads to the largest distortion, while losing the last frame of a GOP leads to little distortion. Furthermore, it is assumed that each video frame (or picture) is packetized with maximum size of 54 bytes and each packet only contains data from one frame. That is, each frame is packetized into an integer number of packets.

Figure 17:
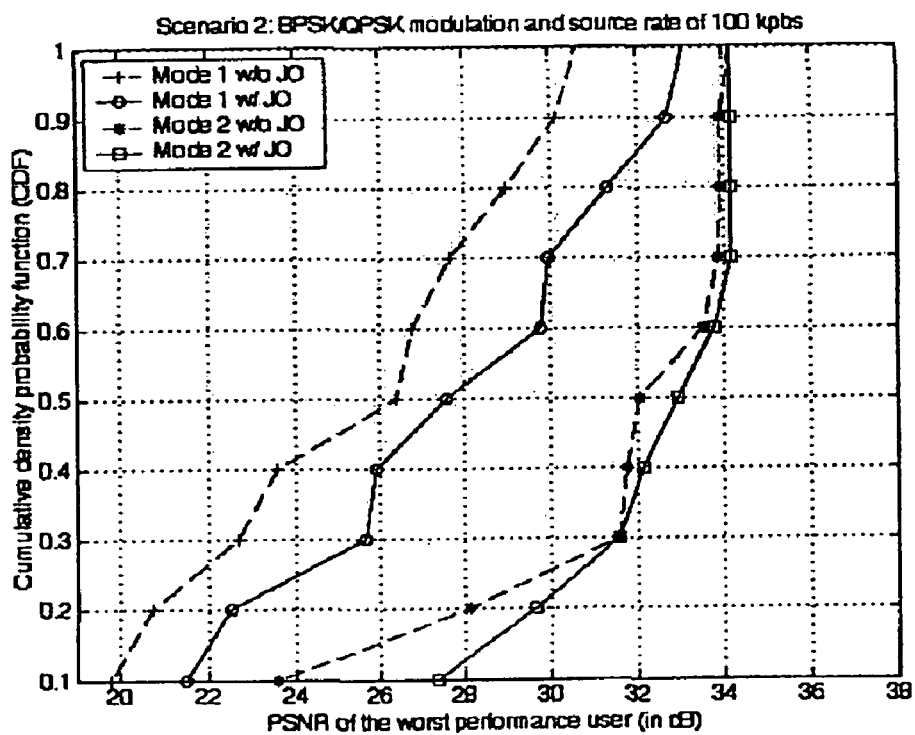
FIG. 17 shows performance comparison for scenario 2.
Figure 18:
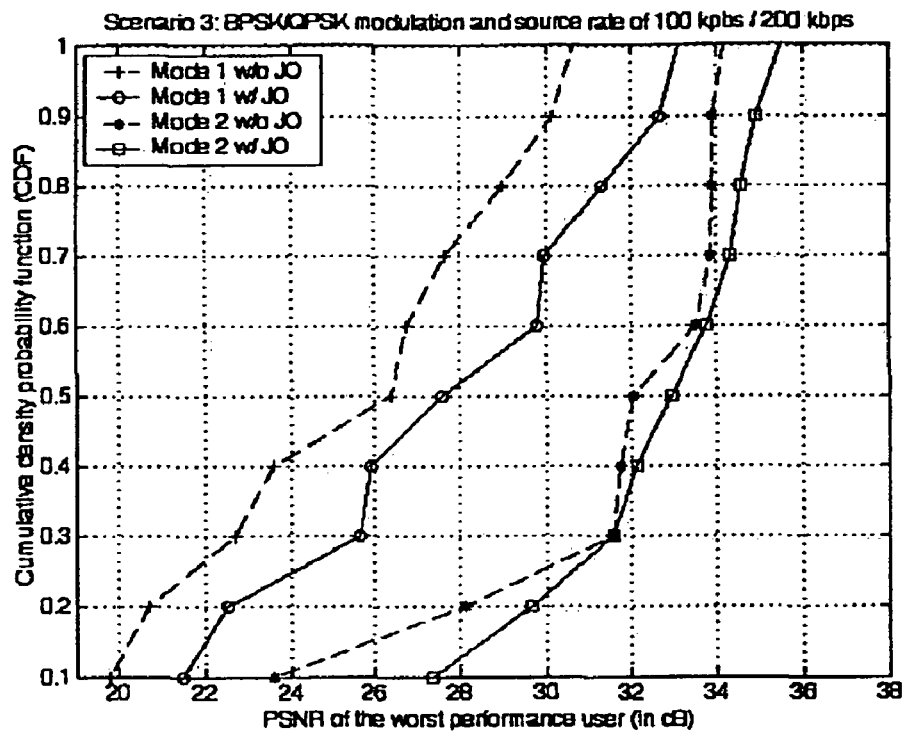
FIG. 18 shows performance comparison for scenario 3.
Figure 19:
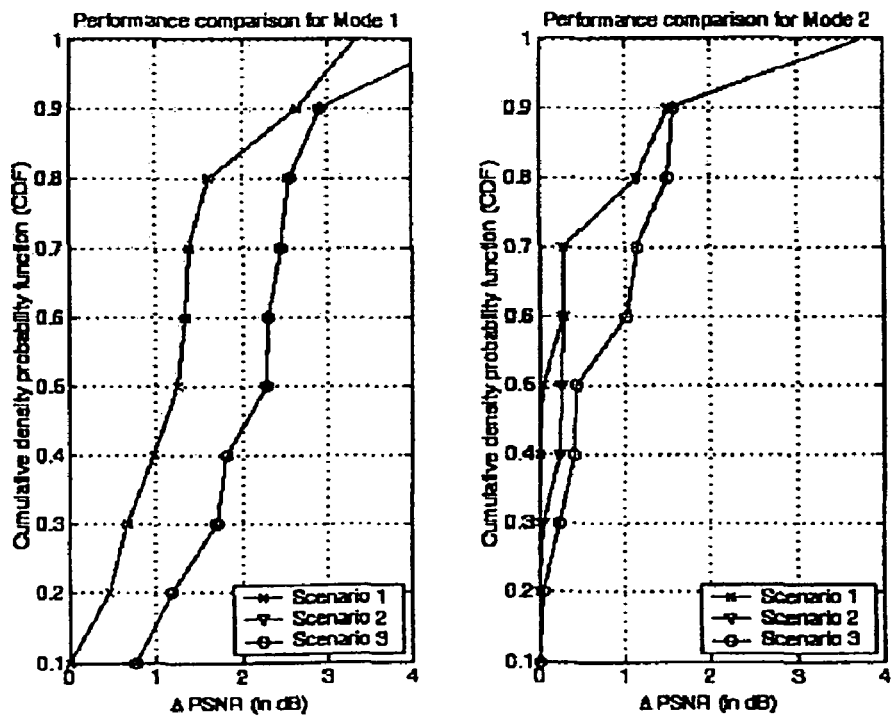
FIG. 19 shows a performance improvement comparison of the 3 investigated scenarios.

The size of each frame is determined during the encoding step. These values are stored along with the bit stream and the distortion profile. FIG. 11b gives the size (in terms of packets) for a GOP in the three measured videos at a source rate of 100 kbps, where I and Pn (n=1, 2 . . . 14) denote the I-frame and the n-th P frame, respectively. We can see that the size of an I-frame is much larger than that of a P-frame and the size of a P-frame varies from frame to frame. This is related to the contents of a video. Both, an operation mode without ARQ (referred to as Forward Mode) and an operation mode with ARQ (referred to as ARQ Mode) are investigated. We consider every GOP as a unit and assume that each GOP has to be transmitted within the duration of 0.5 second. In Forward Mode, we assume no acknowledgement from the clients is available and the video frames of every GOP for a particular client are repeatedly transmitted when the transmission data rate is larger than the source data rate. For instance, every GOP is transmitted twice if the transmission data rate is twice as large as the source data rate. If the transmission data rate is 1.5 times the source data rate, a GOP is transmitted once followed by retransmitting the I-frame, the first P-frame, the second P-frame, etc., until the period of 0.5 second for the GOP is expired. On the other hand, in ARQ Mode, we assume that instantaneous acknowledgement of a transmitted packet is available from the clients and the data packets of every GOP for a particular client are retransmitted in the way that the data packets in a GOP are received successfully in time order. That is, before transmitting anew packet, it is guaranteed that its previous packets in the GOP are received correctly. FIG. 17 to FIG. 19 provide simulation results of three scenarios (scenario 1, 2, and 3). In scenario 1, we restrict that only BPSK modulation is used at the radio link layer and only the source rate with 100 kbps is available at the application layer. Therefore, only one constant abstracted parameter tuple (with 100 kbps for all 3 users) is provided by the application layer in this scenario, while the radio link layer provides 7 abstracted parameter tuples, which results from the 7 cases of time arrangement shown in FIG. 11a. The cross-layer optimizer selects one out of the 7 combinations of the input parameter tuples such that our objective function is optimized. The MSE is a random variable controlled by the two factors discussed above, namely fast fading and user position dependent path loss and shadowing. In general, fast fading takes place in a much smaller timescale than the path loss and shadowing. In this paper, we evaluate the MSE averaged over fast fading by taking the expected value of the MSE with respect to the fast fading for a particular position of the users or equivalently for a particular long term SNR. Based on this value the cross-layer optimizer makes its decision. We also look at its statistical properties for an ensemble of user positions. Therefore, the cumulative density probability function (CDF) of this average MSE is chosen to show the performance of both modes (Forward Mode and ARQ Mode). The performance of the worst performing user in the system with the inventive joint optimization (w/JO) is compared with that in a system without joint optimization (w/o JO). A system without joint optimization is assumed to assign the same amount of transmission time to all the users (i.e., Case 1 in FIG. 11a) and use BPSK modulation, while the source data rate is fixed to 100 kbps. It can be seen from FIG. 17 that the PSNR of the worst performing user improves significantly in the system w/JO.

For instance, there is about 1-40%=60% of the chance that the PSNR of the worst performing user is larger than 30 dB in the system w/JO in Forward Mode, which improves 2 dB when compared to the system w/o JO. A similar trend of improvement can be observed in FIG. 18 and FIG. 19 for scenario 2 and 3. In scenario 2, the same abstracted parameter tuple as in scenario 1 is assumed at the application layer but the radio link layer provides 14 abstracted parameter tuples, which result from the 7 cases of time arrangement with BPSK and another 7 cases of time arrangement with QPSK. The same system without joint optimization (w/o JO) as described in FIG. 17 is also provided for the purpose of comparison. In scenario 3, it is assumed that the two different source rates of 100 kbps and 200 kbps for each of the 3 users are provided by the application layer (resulting in $2^3$=8 parameter tuples). The same abstracted parameter tuples as in scenario 2 are provided by the radio link layer. The performance improves when more abstracted parameter tuples are provided because more degrees of freedom can be obtained. This can be observed in FIG. 14 more clearly, where the performance improvement of the investigated 3 scenarios is shown. Here, PSNR is defined as the difference between the PSNR of the worst performing user in the system w/JO and that in the system w/o JO. A close observation of the left hand side FIG. in FIG. 14 reveals that the amount of performance improvement of scenario 2 is much larger than that of scenario 1 in Forward Mode, while the amount of performance improvement of scenario 3 is only slightly larger than that of scenario 2. This indicates that the choice of higher transmission data rate (by using QPSK) provided by the radio link layer is favorable in this application mode and the optimizer chooses it frequently. In contract, the choice of higher source rate (200 kbps) provided by the application layer is not so favorable in this mode and the optimizer seldom chooses it. On the other hand, this choice of higher source rate is favorable in ARQ Mode, which can be seen from the graph on the right hand side, where the amount of performance improvement of scenario 3 is fairly larger than that of scenario 2. Therefore, choosing a suitable set of abstracted parameters tuples is important in order to obtain large performance improvements while optimizing at low complexity. Also, the experiments show that it is important to identify all degrees of freedom that are available on the individual layers and to consider the important ones in the cross-layer design.

The present invention provides an architecture for the joint optimization of application layer and radio link layer in a wireless system with a video streaming service. This architecture is based on three principle concepts, namely parameter abstraction, cross-layer optimization, and decision distribution. Our preliminary study reveals that the inventive architecture can provide a potential way to improve the performance and therefore help dealing with the future challenge in wireless multimedia communication. Even when considering a small number of degrees of freedom of the application layer and the radio link layer, we obtain significant improvements in user-perceived quality of our streaming video application by joint optimization.

Depending on certain implementation requirements of the inventive methods, the inventive methods can be implemented in hardware or in software. The implementation can be performed using a digital storage medium, in particular a disc or a CD having electronically readable control signals stored thereon, which can cooperate with a programmable computer system such that the inventive methods are performed. Generally, the present invention is therefore a computer program product with a program code stored on a machine-readable digital storage medium, the program code performing the inventive methods, when the computer program product runs on a computer. In other words, the inventive methods are, therefore, a computer program having a program code for 5 performing the inventive methods, when the computer program runs on a computer.

While this invention has been described in terms of several preferred embodiments, there are alterations, permutations, and equivalents which fall within the scope of this invention. It should also be noted that there are many alternative ways of implementing the methods and compositions of the present invention. It is therefore intended that the following appended claims be interpreted as including all such alterations, permutations, and equivalents as fall within the true spirit and scope of the present invention.

What is claimed is:

1. An apparatus for controlling an operation of a plurality of communication layers in a layered communication system, the layered communication system transmitting information through a communication channel from a base station to a plurality of user devices, wherein the information comprises a first information associated with a first user device and a second information associated with a second user device in a multi-user scenario,
wherein an operation of a first communication layer of the plurality of communication layers is determined by a first set of parameters, and wherein an operation of a second communication layer, distinct from said first communication layer, of the plurality of communication layers is determined by a second set of parameters,
wherein the first communication layer is operative for encoding the first information to obtain a first information signal and for encoding the second information to obtain a second information signal, and
wherein the second communication layer is operative for encoding the first information signal and the second information signal to obtain a composite signal to be transmitted through the communication channel,
the apparatus comprising:
a provider for providing a property of the communication channel;
a storage element comprising a plurality of jointly optimized sets of parameters, being optimized across the first communication layer and the second communication layer, to be used in different scenarios, each scenario being defined by a predefined transmission quality for the first and second information and by a predefined communication channel property selected from the group comprising a bit error probability or/and a transmission delay or/and a transmission power associated with the bit error probability, or/and a channel coherence time or/and a channel coherence bandwidth, wherein each jointly optimized set of parameters comprises a pair of the first and second set of pre-computed parameters defining the operation mode for the first and second communication layers for the associated one of the different scenarios;
a selector for selecting from the storage element directly one jointly optimized set of parameters dependent from the channel property the desired transmission quality for the first information and for the second information; and
a provider for providing the first set of parameters and the second set of parameters from the selected jointly optimized set of parameters to the first communication layer and the second set of parameters to the second communication layer.

2. The apparatus in accordance with claim 1, wherein the second communication layer is operative for scheduling the first information signal and the second information signal, so that the first information signal is transmitted within a first time frame and the second information signal is transmitted within a second time frame, wherein the selector is operative for selecting the first set of parameters to obtain the first information signal having a first information rate associated with a first distortion and to obtain the second information signal having a second information rate associated with the second distortion, and for selecting the second set of parameters for obtaining the composite signal having a data rate supporting the first information rate and the second information rate.

3. The apparatus in accordance with claim 1, wherein the first information associated with the first user comprises a first sub-information and a second sub-information, wherein the selector is further operative for selecting the first set of parameters to be used by the first communication layer for selectively encoding the first sub-information and the second sub-information to obtain the first information signal comprising the encoded first and second sub-information.

4. The apparatus in accordance with claim 2, wherein the selector is operative for selecting the first set of parameters for scheduling the first sub-information and the second sub-information within the first information signal, so that the first sub-information and the second sub-information are placed at different positions of the first information signal.

5. The apparatus in accordance with claim 1, further comprising a determiner for determining the first communication layer of which the first set of parameters is to be selected and the second communication layer of which the second set of parameters is to be selected from the plurality of communication layers to achieve the optimization goal.

6. The apparatus in accordance with claim 1, wherein the plurality of layers of the layered communication system are protocol layers, wherein the second communication layer is operative for managing a transmission of the information through the communication channel and for extracting the property of the communication channel, wherein the provider for providing the property of the communication channel is coupled to the second communication layer for receiving the property of the communication channel.

7. The apparatus in accordance with claim 6, wherein the second communication layer comprises a physical layer, wherein the provider for providing the property of the communication channel comprises a protocol interface for interfacing with the physical layer.

8. The apparatus in accordance with claim 1, wherein the selector comprises a decision element for monitoring a current status of the first communication layer determined by a coherent current first set of parameters and a current status of the second communication layer determined by a current second set of parameters, wherein the decision element is further operative for generating a control information from the current statuses, from the optimization goal and from the channel property, wherein the control information indicates that the first set of parameters and/or the second set of parameters are to be selected to achieve the optimization goal, when the optimization goal cannot be achieved using the current first and second set of parameters.

9. The apparatus in accordance with claim 1, wherein the optimization goal comprises the optimization of the transmission quality in a multi-user scenario, wherein the information comprises a first information associated with a first user and a second information associated with the first user, a third information associated with a second user and a fourth information associated with the second user, wherein the first communication layer is operative for scheduling the first information and the second information to obtain a first information signal associated with the first user, and wherein the first communication layer is operative for scheduling the third information and the fourth information to obtain a second information signal associated with the second user, wherein the second communication layer is operative for scheduling the first information signal and the second information signal to obtain a scheduled multi-user stream, wherein the selector is operative for jointly selecting the first set of parameters to be used by the first communication layer to provide the first information signal and the second information signal, and the second set of parameters to be used by the second communication layer to provide the scheduled multi-user stream.

10. The apparatus in accordance with claim 1, further comprising a provider for providing the optimization goal.

11. The apparatus in accordance with claim 1, wherein the second communication layer comprises a physical layer, wherein the first plurality of sets of parameters stored in the storage element comprises a plurality of modulation schemes.

12. The apparatus in accordance with claim 1, wherein the first or the second communication layer comprise a data link layer, wherein the first plurality or the second plurality of parameters stored in the storage element comprise a plurality of forward error correction encoding schemes.

13. The apparatus in accordance with claim 1, wherein the communication layer comprises an application layer, wherein the first plurality of sets of parameters stored in the storage element comprises a plurality of encoding schemes for data compression.

14. A communication apparatus for processing an information to be transmitted in accordance with a transmission protocol, the transmission protocol comprising a plurality of protocol layers, the communication apparatus comprising:
an information source for providing the information;
an apparatus for controlling an operation of a plurality of communication layers in a layered communication system, the layered communication system transmitting information through a communication channel from a base station to a plurality of user devices,
wherein the information comprises a first information associated with a first user device and a second information associated with a second user device in a multi- user scenario, wherein an operation of a first communication layer of the plurality of communication layers is determined by a first set of parameters, and
wherein an operation of a second communication layer, distinct from said first communication layer, of the plurality of communication layers is determined by a second set of parameters, wherein the first communication layer is operative for encoding the first information to obtain a first information signal and for encoding the second information to obtain a second information signal, and
wherein the second communication layer is operative for encoding the first information signal and the second information signal to obtain a composite signal to be transmitted through the communication channel,
the apparatus comprising:
a provider for providing a property of the communication channel;
a storage element comprising a plurality of jointly optimized sets of parameters, being optimized across the first communication layer and the second communication layer, to be used in different scenarios, each scenario being defined by a predefined transmission quality for the first and second information and by a predefined communication channel property selected from the group comprising a bit error probability or/and a transmission delay or/and a transmission power associated with the bit error probability, or/and a channel coherence time or/and a channel coherence bandwidth, wherein each jointly optimized set of parameters comprises a pair of the first and second set of pre-computed parameters defining the operation mode for the first and second communication layers for the associated one of the different scenarios
a selector for selecting from the storage element directly one jointly optimized set of parameters dependent from a first set of parameters from the first plurality of sets of parameters, and for selecting the second set of parameters from the second plurality of sets of parameters, wherein the selector is operative for selecting the first set of parameters and the second set of parameters in dependence of the channel property and the desired transmission quality for the first information and for the second information, and wherein; and
a provider for providing the first set of parameters and the second set of parameters from the selected jointly optimized set of parameters to the first communication layer and to the second communication layer, for controlling the plurality of protocol layers;
a processor for processing the information in accordance with the protocol layers.

15. A method for controlling an operation of a plurality of communication layers in a layered communication system, the layered communication system transmitting information through a communication channel from a base station to a plurality of user devices, wherein the information comprises a first information associated with a first user device and a second information associated with a second user device in a multi-user scenario,
wherein an operation of a first communication layer of the first plurality of communication layers is determined by a first set of parameters, and wherein a operation of a second communication layer, distinct from said first communication layer, of the plurality of communication layers is determined by a second set of parameters,
wherein the first communication layer is operative for encoding the first information to obtain a first information signal and for encoding the second information to obtain a second information signal, and
wherein the second communication layer is operative for encoding the first information signal and the second information signal to obtain a composite signal to be transmitted through the communication channel,
the method comprising the following steps of:
providing a property of the communication channel;
storing in a storage element a plurality of jointly optimized sets of parameters, being optimized across the first communication layer and the second communication layer, to be used in different scenarios, each scenario being defined by a predefined transmission quality for the first and second information and by a predefined communication channel property selected from the group comprising a bit error probability or/and a transmission delay or/and a transmission power associated with the bit error probability, or/and a channel coherence time or/and a channel coherence bandwidth, wherein each jointly optimized set of parameters comprises a pair of the first and second set of pre-computed parameters defining the operation mode for the first and second communication layers for the associated one of the different scenarios a first plurality of sets of parameters defining different operation modes of the first communication layer;

selecting from the storage element directly one jointly optimized set of parameters dependent from the channel property and the desired transmission quality of the first information and of the second information; and providing the first set of parameters and the second set of parameters from the selected jointly optimized set of parameters to the first communication layer and to the second communication layer.

16. A method for processing an information to be transmitted in accordance with a transmission protocol, the transmission protocol comprising a plurality of protocol layers, the method comprising the following steps of:

providing the information;

controlling the plurality of protocol layers in accordance with a method for controlling an operation of a plurality of communication layers in a layered communication system, the layered communication system transmitting information through a communication channel from a base station to a plurality of user devices, wherein the information comprises a first information associated with a first user device and a second information associated with a second user device in a multi-user scenario, wherein an operation of a first communication layer of the first plurality of communication layers is determined by a first set of parameters, and wherein a operation of a second communication layer, distinct from said first communication layer, of the plurality of communication layers is determined by a second set of parameters, wherein the first communication layer is operative for encoding the first information to obtain a first information signal and for encoding the second information to obtain a second information signal, wherein the second communication layer is operative for encoding the first information signal and the second information signal to obtain a composite signal to be transmitted through the communication channel, the method comprising the following steps of:

providing a property of the communication channel;

storing in a storage element a plurality of jointly optimized sets of parameters, being optimized across the first communication layer and the second communication layer, to be used in different scenarios, each scenario being defined by a predefined transmission quality for the first and second information and by a predefined communication channel property selected from the group comprising a bit error probability or/and a transmission delay or/and a transmission power associated with the bit error probability, or/and a channel coherence time or/and a channel coherence bandwidth, wherein each jointly optimized set of parameters comprises a pair of the first and second set of pre-computed parameters defining the operation mode for the first and second communication layers for the associated one of the different scenarios;

selecting from the storage element directly one jointly optimized set of parameters dependent from the channel property and the desired transmission quality of the first information and of the second information; and providing the first set of parameters and the second set of parameters from the selected jointly optimized set of parameters to the first communication layer and to the second communication layer;

processing the information in accordance with the protocol layer.

17. A computer program stored on a computer-readable medium, said computer program having a program code for performing the method for controlling an operation of a plurality of communication layers in a layered communication system, the layered communication system transmitting information through a communication channel from a base station to a plurality of user devices, wherein the information comprises a first information associated with a first user device and a second information associated with a second user device in a multi-user scenario, wherein an operation of a first communication layer of the first plurality of communication layers is determined by a first set of parameters, and wherein a operation of a second communication layer, distinct from said first communication layer, of the plurality of communication layers is determined by a second set of parameters, wherein the first communication layer is operative for encoding the first information to obtain a first information signal and for encoding the second information to obtain a second information signal, and wherein the second communication layer is operative for encoding the first information signal and the second information signal to obtain a composite signal to be transmitted through the communication channel, the method comprising the following steps of:

providing a property of the communication channel;

storing in a storage element a plurality of jointly optimized sets of parameters, being optimized across the first communication layer and the second communication layer, to be used in different scenarios, each scenario being defined by a predefined transmission quality for the first and second information and by a predefined communication channel property selected from the group comprising a bit error probability or/and a transmission delay or/and a transmission power associated with the bit error probability, or/and a channel coherence time or/and a channel coherence bandwidth, wherein each jointly optimized set of parameters comprises a pair of the first and second set of pre-computed parameters defining the operation mode for the first and second communication layers for the associated one of the different scenarios;

selecting from the storage element directly one jointly optimized set of parameters dependent from the channel property and the desired transmission quality of the first information and of the second information; and providing the first set of parameters and the second set of parameters from the selected jointly optimized set of parameters to the first communication layer and to the second communication layer, when the program runs on a computer.

18. A computer program stored on a computer-readable medium, said computer program having a program code for performing the method for processing an information to be transmitted in accordance with a transmission protocol, the transmission protocol comprising a plurality of protocol layers, the method comprising the following steps of:

providing the information;

controlling the plurality of protocol layers in accordance with t4--amethod for controlling an operation of a plurality of communication layers in a layered communication system, the layered communication system transmitting information through a communication channel from a base station to a plurality of user devices, wherein the information comprises a first information associated with a first user device and a second information associated with a second user device in a multi-user scenario, wherein an operation of a first communication layer of the first plurality of communication layers is determined by a first set of parameters, and wherein a operation of a second communication layer, distinct from said first communication layer, of the plurality of communication layers is determined by a second set of parameters, wherein the first communication layer is operative for encoding the first information to obtain a first information signal and for encoding the second information to obtain a second information signal, wherein the second communication layer is operative for encoding the first information signal and the second information signal to obtain a composite signal to be transmitted through the communication channel, the method comprising the following steps of:

providing a property of the communication channel;

storing in a storage element a plurality of jointly optimized sets of parameters, being optimized across the first communication layer and the second communication layer, to be used in different scenarios, each scenario being defined by a predefined transmission quality for the first and second information and by a predefined communication channel property selected from the group comprising a bit error probability or/and a transmission delay or/and a transmission power associated with the bit error probability, or/and a channel coherence time or/and a channel coherence bandwidth, wherein each jointly optimized set of parameters comprises a pair of the first and second set of pre-computed parameters defining the operation mode for the first and second communication layers for the associated one of the different scenarios;

selecting from the storage element directly one jointly optimized set of parameters dependent from the channel property and the desired transmission quality of the first information and of the second information; and providing the first set of parameters to the first communication layer and the second set of parameters from the selected jointly optimized set of parameters and to the second communication layer;

processing the information in accordance with the protocol layer, when the program runs on a computer.

19. The apparatus in accordance with claim 1, wherein the first and second set of pre-computed parameters defining the operation mode for the first and second communication layers for the associated one of the different scenarios are computed by a first abstraction model and a second abstraction model and a cross-layer optimizer, each abstraction model causing a parameter abstraction to transform the communication layer specific first and second parameters into first and second key parameters comprehensible for the cross-layer optimizer; wherein the first abstraction model causes a first communication layer parameter abstraction to define a plurality of first key parameters being described by one or more parameters of said first parameters, and the second abstraction model causes a second communication layer parameter abstraction to define a plurality of second key parameters being described by one or more parameters of said second parameters, and wherein the cross-layer optimizer jointly determines the optimized set of parameters to be used by the first communication layer and the second communication layer based on the first and second key parameters, the channel property and the desired transmission quality.

20. The communication apparatus in accordance with claim 14, wherein the first and second set of pre-computed parameters defining the operation mode for the first and second communication layers for the associated one of the different scenarios are computed by a first abstraction model and a second abstraction model and a cross-layer optimizer, each abstraction model causing a parameter abstraction to transform the communication layer specific first and second parameters into first and second key parameters comprehensible for the cross-layer optimizer; wherein the first abstraction model causes a first communication layer parameter abstraction to define a plurality of first key parameters being described by one or more parameters of said first parameters, and the second abstraction model causes a second communication layer parameter abstraction to define a plurality of second key parameters being described by one or more parameters of said second parameters, and wherein the cross-layer optimizer jointly determines the optimized set of parameters to be used by the first communication layer and the second communication layer based on the first and second key parameters, the channel property and the desired transmission quality.

21. The method in accordance with claim 15, wherein the first and second set of pre-computed parameters defining the operation mode for the first and second communication layers for the associated one of the different scenarios are computed by a first abstraction model and a second abstraction model and a cross-layer optimizer, each abstraction model causing a parameter abstraction to transform the communication layer specific first and second parameters into first and second key parameters comprehensible for the cross-layer optimizer; wherein the first abstraction model causes a first communication layer parameter abstraction to define a plurality of first key parameters being described by one or more parameters of said first parameters, and the second abstraction model causes a second communication layer parameter abstraction to define a plurality of second key parameters being described by one or more parameters of said second parameters, and wherein the cross-layer optimizer jointly determines the optimized set of parameters to be used by the first communication layer and the second communication layer based on the first and second key parameters, the channel property and the desired transmission quality.

22. The method in accordance with claim 16, wherein the first and second set of pre-computed parameters defining the operation mode for the first and second communication layers for the associated one of the different scenarios are computed by a first abstraction model and a second abstraction model and cross-layer optimizer, each abstraction model causing a parameter abstraction to transform the communication layer specific first and second parameters into first and second key parameters comprehensible for the cross-layer optimizer; wherein the first abstraction model causes a first communication layer parameter abstraction to define a plurality of first key parameters being described by one or more parameters of said first parameters, and the second abstraction model causes a second communication layer parameter abstraction to define a plurality of second key parameters being described by one or more parameters of said second parameters, and wherein the cross-layer optimizer jointly determines the optimized set of parameters to be used by the first communication layer and the second communication layer based on the first and second key parameters, the channel property and the desired transmission quality.

23. The computer program in accordance with claim 17, wherein the first and second set of pre-computed parameters defining the operation mode for the first and second communication layers for the associated one of the different scenarios are computed by a first abstraction model and a second abstraction model and a cross-layer optimizer, each abstraction model causing a parameter abstraction to transform the communication layer specific first and second parameters into first and second key parameters comprehensible for the cross-layer optimizer; wherein the first abstraction model causes a first communication layer parameter abstraction to define a plurality of first key parameters being described by one or more parameters of said first parameters, and the second abstraction model causes a second communication layer parameter abstraction to define a plurality of second key parameters being described by one or more parameters of said second parameters, and wherein the cross-layer optimizer jointly determines the optimized set of parameters to be used by the first communication layer and the second communication layer based on the first and second key parameters, the channel property and the desired transmission quality.

24. The computer program in accordance with claim 18, wherein the first and second set of pre-computed parameters defining the operation mode for the first and second communication layers for the associated one of the different scenarios are computed by a first abstraction model and a second abstraction model and a cross-layer optimizer, each abstraction model causing a parameter abstraction to transform the communication layer specific first and second parameters into first and second key parameters comprehensible for the cross-layer optimizer; wherein the first abstraction model causes a first communication layer parameter abstraction to define a plurality of first key parameters being described by one or more parameters of said first parameters, and the second abstraction model causes a second communication layer parameter abstraction to define a plurality of second key parameters being described by one or more parameters of said second parameters, and wherein the cross-layer optimizer jointly determines the optimized set of parameters to be used by the first communication layer and the second communication layer based on the first and second key parameters, the channel property and the desired transmission quality.

* * * * *

UNITED STATES PATENT AND TRADEMARK OFFICE
CERTIFICATE OF CORRECTION

PATENT NO. : 7,609,652 B2 Page 1 of 1
APPLICATION NO. : 11/404941
DATED : October 27, 2009
INVENTOR(S) : Kellerer et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 711 days.

Signed and Sealed this

Twelfth Day of October, 2010

David J. Kappos
*Director of the United States Patent and Trademark Office*